United States Patent
Sugimoto et al.

(10) Patent No.: US 7,298,844 B2
(45) Date of Patent: Nov. 20, 2007

(54) RECORDING/REPRODUCING APPARATUS, DATA MOVING METHOD, AND DATA DELETION METHOD

(75) Inventors: Hiroshi Sugimoto, Osaka (JP); Hideshi Ishihara, Osaka (JP); Takahiro Nagai, Osaka (JP); Hirofumi Ide, Hyogo (JP)

(73) Assignee: Matsushita Electric Industrial Co., Ltd., Kasoma (JP)

( * ) Notice: Subject to any disclaimer, the term of this patent is extended or adjusted under 35 U.S.C. 154(b) by 826 days.

(21) Appl. No.: 10/115,405

(22) Filed: Apr. 3, 2002

(65) Prior Publication Data

US 2002/0150245 A1  Oct. 17, 2002

(30) Foreign Application Priority Data

Apr. 11, 2001  (JP)  ............... 2001-112325

(51) Int. Cl.
*H04N 7/167* (2006.01)
*G06K 9/00* (2006.01)
*H04K 1/00* (2006.01)
*H04L 9/00* (2006.01)

(52) U.S. Cl. ............... 380/201; 726/26; 713/189; 713/193; 705/57

(58) Field of Classification Search ............... 380/201
See application file for complete search history.

(56) References Cited

U.S. PATENT DOCUMENTS 5,646,993 A   7/1997  Aizawa
6,134,660 A * 10/2000  Boneh et al. ............... 713/193
6,745,166 B1 * 6/2004  Sugahara et al. ........... 380/285
7,093,128 B2 * 8/2006  Asano et al. ............... 713/171
2002/0150251 A1 * 10/2002  Asano et al. ............... 380/277

FOREIGN PATENT DOCUMENTS

| EP | 1 037 460 | 9/2000 |
|----|-----------|--------|
| EP | 1 047 062 | 10/2000 |
| JP | 10-064187 | 6/1998 |
| JP | 2001-119386 | 4/2001 |

OTHER PUBLICATIONS

European Search Report regarding Application No. 02007378.9-2202 dated Aug. 16, 2002.

* cited by examiner

Primary Examiner—Gilberto Barrón, Jr.
Assistant Examiner—Abdulhakim Nobahar
(74) Attorney, Agent, or Firm—Renner, Otto, Boisselle & Sklar, LLP

(57) ABSTRACT

A recording/reproducing apparatus includes: a first storage section for storing data structure information which includes encrypted data; a special information holding section for holding special information associated with the data structure information; and a controller for controlling the first storage section and the special information holding section. The data structure information is associated with the special information such that the special information is updated in response to an update of the data structure information, or such that the data structure information is updated in response to an update of the special information. The controller controls movement of the encrypted data from the first storage section to a second storage section, and the controller updates the special information such that a mismatch occurs between the special information obtained before the movement of the encrypted data and the special information obtained after the movement of the encrypted data.

17 Claims, 22 Drawing Sheets

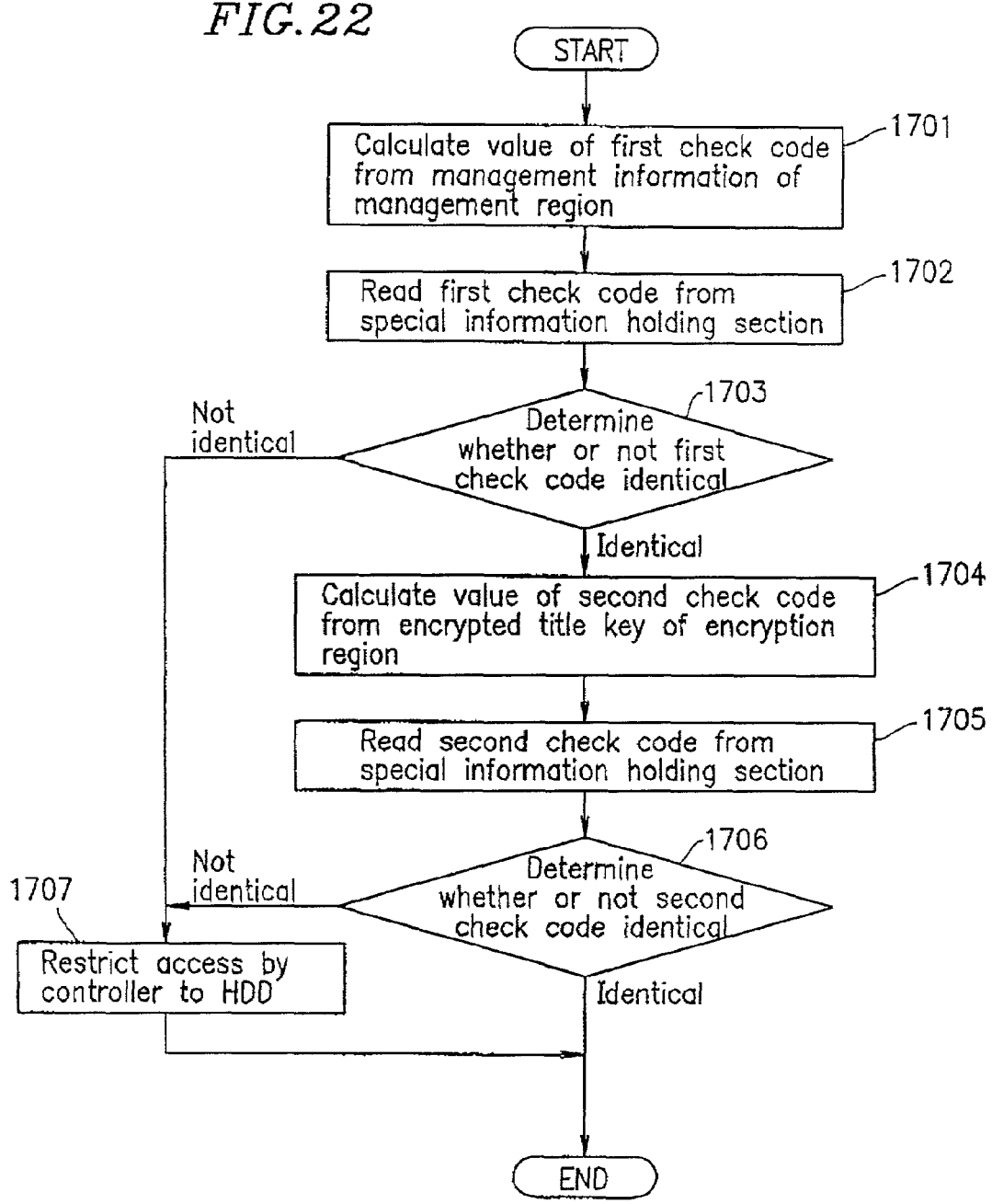

RECORDING/REPRODUCING APPARATUS, DATA MOVING METHOD, AND DATA DELETION METHOD

BACKGROUND OF THE INVENTION

1. Field of the Invention

The present invention relates to a recording/reproducing apparatus in which illegal copying and illegal use of copy-generation managed data is prevented. Further, the present invention also relates to a method for moving data and a method for deleting data in which illegal copying and illegal use of copy-generation managed data is prevented.

2. Description of the Related Art

In recent years, various digital recording/reproducing apparatuses have been developed and marketed. Among these digital recording/reproducing apparatuses, data can be copied without deteriorating the image quality and sound quality of the data. Thus, a digitalized, copyrighted production can be copied into a widespread, large capacity recording medium, such as a D-VCR, DVD-RAM, etc., with high image- and sound-qualities. By copying a production in such a way, illegally copied products called "bootlegs" can be made. The illegally copied products can be readily distributed among the general public anonymously, and accordingly, the copyright of the production is violated. It is therefore necessary to prevent such illegally copied products in order to protect copyrights.

A known technique for preventing production of such an illegally copied product is described in Japanese Laid-Open Publication No. 2001-16542. According to this technique, a predetermined ID bit for preventing illegal copying (a prohibition code of the CGMS (copy generation management system) standard) is superposed on an analog signal obtained by converting a digital signal recorded on an original recording medium. With such a superposed ID bit, illegal copying is prevented.

However, even if the above technique described in Japanese Laid-Open Publication No. 2001-16542 is employed, when data is transferred between apparatuses, a fraudulent party can steal the data from a data transfer path between the apparatuses so as to make an illegally copied product.

A known technique for invalidating illegally copied data is described in Japanese Laid-Open Publication No. 11-39895. In this technique, digital data includes: an encrypted main part of the data; encrypted copy management information for managing permission/prohibition of copy for the main part of the data; and key information for decrypting the encrypted main part of the data. When the copy management information indicates that copying of the main part of the data is prohibited, decryption of the illegally copied, encrypted data is disabled by updating the key information.

However, even if the above technique described in Japanese Laid-Open Publication No. 11-39895 is employed, since the encrypted main part of the data and the key information used for decrypting the encrypted main part of the data are included in the same digital data, a fraudulent party can copy (harbor) the digital data in an external recording device or the like in a byte-by-byte manner before the key information is updated, so as to decrypt the illegally copied, encrypted main part of the data.

Furthermore, recently, movement of data which is stored in a large capacity recording device, such as a hard disc, to a highly-reliable medium, such as an optical disc for making a backup copy has been demanded.

In general, data distributed by digital broadcasting is protected from being stored, but there is some data that can be stored for the sake of user's convenience only for a predetermined time period. There is a demand to surely delete such data such that a fraudulent party cannot illegally copy the data.

FIG. 1 shows a structure of a conventional video recording/reproducing apparatus 910. The video recording/reproducing apparatus 910 includes: a data input section 900; an encryption section 901; a temporary storage section 902; a data output section 903; a decryption section 904; a central processing unit (CPU) 905; an input/output section 906; a fixed storage device 907; a read/write section 908; and an information recording medium 909. The CPU 905 controls the data input section 900; the encryption section 901; the temporary storage section 902; the data output section 903; the decryption section 904; the input/output section 906; and the read/write section 908.

The data input section 900 converts externally-input analog image data into digitally compressed image data. If copy generation management information attached to the compressed image data, which is input to the encryption section 901, is free-content information indicating that the compressed data is a free content, the encryption section 901 does not perform an encryption process. If the copy generation management information indicates that production of a child copy (first generation copy) is permitted, the encryption section 901 changes the copy generation management information into copy prohibition information, and the compressed image data is encrypted and stored in the temporary storage section 902. The temporary storage section 902 is a high speed memory, such as an SDRAM or the like. Since the above described sections work based on different data transfer rates, the temporary storage section 902 is used as buffer means for buffering the transfer rate difference among the sections. The decryption section 904 decrypts encrypted data and outputs the decrypted data to the data output section 903. The data output section 903 converts the decrypted, digitally compressed image data into analog image data, and outputs the analog image data to an external apparatus. The input/output section 906 is a communication control means, such as IDE, SCSI, or the like, which controls data transfer to/from the fixed storage device 907, such as a hard disc. The read/write section 908 writes data in and/or reads data from the portable information recording medium 909, such as a DVD-RAM or the like.

Next, a data recording operation of the video recording/reproducing apparatus 910 is described.

The data input section 900 externally receives analog image data, such as a broadcast wave, and digitally compresses the analog image data based on MPEG The compressed image data is transferred to the encryption section 901. If the copy generation management information attached to the compressed image data is the copy prohibition information, the encryption section 901 is controlled by the CPU 905 so as to stop a recording operation. If the copy generation management information is information which permits making a first generation copy, the encryption section 901 changes the copy generation management information into copy prohibition information, and encrypts the compressed image data using a title key Dh which includes information inherent to the fixed storage device 907. The encrypted data is transferred to the temporary storage section 902. If copy generation management information is free-content information, the encryption section 901 does not perform an encryption process and transfers the compressed image data as it is to the temporary storage section 902. The data stored in the temporary storage section 902 is then transferred to, and stored as a file in, the fixed storage device 907 through the input/output section 906. In this way, recording of the image data is performed.

FIG. 2 shows the structure of the fixed storage device 907. The fixed storage device 907 has data structure information including: a management region 1111 for storing management information, such as an address and data size of stored data; and an object region 1112 for storing the data and the title key Dh used for encrypting the data. The management information is updated every time data comes to the object region and is stored therein.

Next, a data reproduction operation of the video recording/reproducing apparatus 910 is described.

The CPU 905 reads management information from the management region 1111 of the fixed storage device 907 through the input/output section 906. The input/output section 906 searches for a position of data to be reproduced based on the read information (address) and reads the data from the position in the object region 1112 into the temporary storage section 902. The CPU 905 transfers the data stored in the temporary storage section 902 to the decryption section 904. The decryption section 904 decrypts the data using the title key Dh. The decrypted data is transferred to the data output section 903. The data output section 903 converts the decrypted, compressed image data into analog image data, which is output to an external apparatus, such as a TV monitor or the like. In this way, reproduction of image data is performed.

FIG. 3 illustrates a procedure for moving data in the video recording/reproducing apparatus 910 from the fixed storage device 907 to the information recording medium 909. Herein, the data is a program, for example.

FIG. 4 shows the inside states of the fixed storage device 907 and the information recording medium 909 during a data movement operation. For the sake of simplicity, among the components of the video recording/reproducing apparatus 910 shown in FIG. 1, only the fixed storage device 907 and the information recording medium 909 are shown in FIG. 4. With reference to FIGS. 3 and 4 in conjunction with FIG. 1, a procedure for moving an encrypted program from the fixed storage device 907 to the information recording medium 909 is described in steps 1100 to 1105 below. Movement of data (program P1) from the fixed storage device 907 to the information recording medium 909 begins at State (I).

Step 1100:
Based on management information A stored in the management region 1111, the program P1 and the title key Dh used for encrypting the program P1 are read from the object region 1112 to the temporary storage section 902.

Step 1101:
The program P1 is moved to the decryption section 904 and decrypted using the title key Dh.

Step 1102:
The decrypted program P1 is transferred to the encryption section 901. In the encryption section 901, the decrypted program P1 is encrypted again using a title key Dd which includes information inherent to the information recording medium 909, and transferred to the temporary storage section 902.

Step 1103:
There-encrypted program P1 in the temporary storage section 902 is written in the information recording medium 909 by the read/write section 908.

Step 1104:
Steps 1100 to 1103 are repeated until all the data included in the program P1 to be moved is moved to the information recording medium 909.

Step 1105:
All the data of the program P1 has been moved to the information recording medium 909 (at this time, the fixed storage device 907 and the information recording medium 909 are in State (II)), the program P1 which has been moved to the information recording medium 909 are deleted from the object region 1112, and the management information A stored in the management region 1111 is updated to management information A'. At this time, the fixed storage device 907 and the information recording medium 909 are in State (III), which means that movement of the programs has been completed Data recorded in the video recording/reproducing apparatus 910 shown in FIG. 1 is data from which production of only a first generation copy (child copy) is permitted. Thus, copying of such data into the information recording medium 909, such as an optical disc, is not permitted, and accordingly, the fixed storage device 907 and the information recording medium 909 never simultaneously store the same data.

However, in the above structure, a plurality of illegal copies can be produced by connecting another fixed storage device 911, such as a personal computer having a hard disk, to the video recording/reproducing apparatus 910 shown in FIG. 1, and harboring the data in the fixed storage device 911.

Now, assume that the video recording/reproducing apparatus 910 moves data P1 from the fixed storage device 907 to the information recording medium 909. At State (I) of FIG. 4, data structure information stored in the fixed storage device 907 is harbored into the personal computer 911 in a byte-by-byte manner. Then, when the video recording/reproducing apparatus 910 is at State (III), the data harbored into the personal computer 911 (data structure information at State (I)) is returned to the fixed storage device 907, so that the management region 1111 and the object region 1112 are changed from the post-movement/deletion state, i.e., State (III), to the pre-movement state, i.e., State (I). As a result, the video recording/reproducing apparatus 910 results in a state where an illegal copy can be made, i.e., State (IV). In this state, the fixed storage device 907 and the information recording medium 909 simultaneously store the same data (for example, the program P1). By performing the above processing, a plurality of illegal copies can be readily produced. On the other hand, the video recording/reproducing apparatus 910 itself determines that the data movement operation has been successfully achieved because the moved data was once deleted from the fixed storage device 907 of the video recording/reproducing apparatus 910.

Although music data of about three minutes in length can be quickly moved in a moment, the video recording/reproducing apparatus 910 cannot complete movement of large video data, such as a piece of movie, in a moment. Thus, when the operation of the video recording/reproducing apparatus 910 is interrupted by, for example, turning off the power supply at any timing during data movement (for example, between State (II) and State (III) In FIG. 4), the video recording/reproducing apparatus 910 cannot delete the data from the fixed storage device 907. As a result, the data movement operation is interrupted when the video recording/reproducing apparatus 910 is at State (II), so that the fixed storage device 907 and the information recording medium 909 simultaneously store the same data (for example, the program P1). By performing the above processing, a plurality of illegal copies can be readily produced.

SUMMARY OF THE INVENTION

According to one aspect of the present invention, a recording/reproducing apparatus includes: a first storage section for storing data structure information which includes encrypted data; a special information holding section for holding special information associated with the data structure information; and a controller for controlling the first storage section and the special information holding section, wherein the data structure information and the special information are associated with each other such that the special information is updated in response to an update of the data structure information, or such that the data structure information is updated in response to an update of the special information, the controller controls movement of the encrypted data from the first storage section to a second storage section, and the controller updates the special information held in the special information holding section such that a mismatch occurs between the special information obtained before the movement of the encrypted data from the first storage section to the second storage section and the special information obtained after the movement of the encrypted data from the first storage section to the second storage section.

In one embodiment of the present invention, the second storage section is provided inside of the recording/reproducing apparatus.

In another embodiment of the present invention, the second storage section is provided outside of the recording/reproducing apparatus.

In still another embodiment of the present invention, the data structure information includes: an object region for storing data which is encrypted using a title key corresponding to a predetermined unit amount of data; a management region for storing management information of the encrypted data; and an encryption region for storing the title key which is encrypted using a system key, wherein the special information is the system key, every time the encrypted data is moved from the first storage section to the second storage section, the controller deletes the moved data from the object region, updates the management information; and deletes from the encryption region the encrypted title key which is used for decrypting the moved data, and the controller updates the system key and encrypts the title key using the updated system key.

In still another embodiment of the present invention, the data structure information includes: an object region for storing data which is encrypted using a title key corresponding to a predetermined unit amount of data; a management region for storing management information of the encrypted data; and an encryption region for storing the title key and the management information which are encrypted using a system key, wherein the special information is the system key, the controller controls a movement of a predetermined amount of content included in the encrypted data from the first storage section to the second storage section, the controller updates the system key every time the predetermined amount of content is moved from the first storage section to the second storage section, every time the predetermined amount of content is moved from the first storage section to the second storage section, the controller deletes the moved predetermined amount of content from the object region, updates the management information, and encrypts the title key and the updated management information using the updated system key, and when the amount of moved contents becomes equal to the predetermined unit data amount, the controller deletes from the encryption region the encrypted title key which is used for decrypting the data.

In still another embodiment of the present invention, at the start-up of the recording/reproducing apparatus, the controller decrypts the management information using the system key, and overwrites the decrypted management information in the management region.

In still another embodiment of the present invention, the data structure information includes: an object region for storing a content which is a part of the encrypted data and which is encrypted using a title key corresponding to the content; and a management region for storing management information of the encrypted content and correspondence information which represents a correspondence between the encrypted content and the title key used for decrypting the encrypted content, the correspondence being established by allocating ID information to the encrypted content, wherein the special information includes the title key to which the ID information is allocated and which is encrypted using a system key, the controller controls a movement of the encrypted content from the first storage section to the second storage section, every time the encrypted content is moved from the first storage section to the second storage section, the controller deletes the moved content from the object region and updates the management information, and every time the encrypted content is moved from the first storage section to the second storage section, the controller deletes from the special information holding section the encrypted title key which has the same ID information as that allocated to the deleted content, thereby updating the special information held in the special information holding section.

In still another embodiment of the present invention, the special information further includes the system key; and the controller updates the system key at a predetermined time interval, and encrypts the title key using the updated system key, thereby updating the special information held in the special information holding section.

In still another embodiment of the present invention, the data structure information includes: an object region for storing data which is encrypted using a title key corresponding to a predetermined unit amount of data; a management region for storing management information of the encrypted data; and an encryption region for storing the title key which is encrypted using a system key, the special information includes: a first check code which is calculated from the management information; and a second check code which is calculated from the encrypted title key, the controller controls a movement of a predetermined amount of content included in the encrypted data from the first storage section to the second storage section, every time the predetermined amount of content is moved from the first storage section to the second storage section, the controller deletes from the object region the moved predetermined amount of content, thereby updating the management information, every time the predetermined amount of content is deleted from the first storage section, the controller updates the first check code held in the special information holding section by means of a calculation based on the updated management information, when the amount of moved contents becomes equal to the predetermined unit data amount, the controller deletes from the encryption region the encrypted title key which is used for decrypting the data, and every time the data is deleted, the controller updates the second check code held in the special information holding section by means of a calculation based on the encrypted title key In still another embodiment of the present invention, the special information further includes the system key, the controller updates the system key every time the predetermined amount of content is moved from the first storage section to the second storage section, and the controller encrypts the title key using the updated system key, thereby updating the encryption region.

In still another embodiment of the present invention, the controller determines whether or not a first check code and a second check code, which are calculated at the start-up of the recording/reproducing apparatus from the management information and the encrypted title key, respectively, are identical to the first check code and the second check code held in the special information holding section.

According to another aspect of the present invention, a recording/reproducing apparatus includes: a storage section for storing data structure information which includes encrypted data, the encrypted data including a content which is allowed to be stored for a predetermined time period; a special information holding section for holding special information associated with the data structure information; and a controller for controlling the storage section and the special information holding section, wherein the data structure information and the special information are associated with each other such that the special information is updated in response to an update of the data structure information, or such that the data structure information is updated in response to an update of the special information, the controller controls deletion of the content from the storage section after a predetermined time period has elapsed, and the controller updates the special information held in the special information holding section such that a mismatch occurs between the special information obtained before the deletion of the content from the storage section and the special information obtained after the deletion of the content from the storage section.

In one embodiment of the present invention, the data structure information includes: an object region for storing data which is encrypted using a title key corresponding to a predetermined unit amount of data; a management region for storing management information of the encrypted data; and an encryption region for storing the title key which is encrypted using a system key, wherein the special information is the system key, the data is a content which can be stored for a predetermined time period, every time the content is deleted from the storage section after a predetermined time period has elapsed, the controller updates the management information and the system key, and the controller deletes from the encryption region the encrypted title key used for decrypting the content, and encrypts the title key using the updated system key.

In another embodiment of the present invention, the data structure information includes: an object region for storing data which is encrypted using a title key corresponding to a predetermined unit amount of data; a management region for storing management information of the encrypted data; and an encryption region for storing the title key and management information which are encrypted using a system key, wherein the special information is the system key, every time the content is deleted from the storage section after a predetermined time period has elapsed, the controller updates the management information and the system key, the controller encrypts the title key and the updated management information using the updated system key, and when the amount of deleted contents becomes equal to the predetermined unit data amount, the controller deletes from the encryption region the encrypted title key which is used for decrypting the data.

In still another embodiment of the present invention, the data structure information includes: an object region for storing a content which is a part of the encrypted data and which is encrypted using a title key corresponding to the content; and a management region for storing management information of the encrypted content and correspondence information which represents a correspondence between the encrypted content and the title key used for decrypting the encrypted content, the correspondence being established by allocating ID information to the encrypted content, wherein the special information includes the title key to which the ID information is allocated and which is encrypted using a system key, every time the encrypted content is deleted from the storage section after a predetermined time period has elapsed, the controller updates the management information, and every time the encrypted content is deleted from the storage section after a predetermined time period has elapsed, the controller deletes from the special information holding section the encrypted title key which has the same ID information as that allocated to the deleted content, thereby updating the special information held in the special information holding section.

In still another embodiment of the present invention, the special information further includes the system key, and the controller updates the system key at every predetermined time, and encrypts the title key using the updated system key, thereby updating the special information held in the special information holding section.

In still another embodiment of the present invention, the data structure information includes: an object region for storing data which is encrypted using a title key corresponding to a predetermined unit amount of data; a management region for storing management information of the encrypted data; and an encryption region for storing the title key which is encrypted using a system key, the special information includes: a first check code which is calculated from the management information; and a second check code which is calculated from the encrypted title key, every time the predetermined amount of content is deleted from the storage section after a predetermined time period has elapsed, the controller updates the management information, every time the management information is updated, the controller updates the first check code held in the special information holding section by means of a calculation based on the updated management information, when the amount of deleted content becomes equal to the predetermined unit data amount, the controller deletes from the encryption region the encrypted title key which is used for decrypting the data, thereby updating the encryption region, and the controller updates the second check code held in the special information holding section by means of a calculation based on the encrypted title key.

In still another embodiment of the present invention, the special information further includes the system key, every time the predetermined amount of content is deleted from the storage section after a predetermined time period has elapsed, the controller updates the system key, and every time the system key is updated, the controller encrypts the title key using the updated system key, thereby updating the encryption region.

According to still another aspect of the present invention, there is provided a method for moving data from a recording/reproducing apparatus, the recording/reproducing apparatus including: a first storage section for storing data structure information which includes encrypted data; a special information holding section for holding special information associated with the data structure information; and a controller for controlling the first storage section and the special information holding section, wherein the data structure information and the special information are associated with each other such that the special information is updated in response to an update of the data structure information, or such that the data structure information is updated in response to an update of the special information, the method comprising steps of: a) moving the encrypted data from the first storage section to a second storage section; and b) updating the special information held in the special information holding section every time step a) is completed such that a mismatch occurs between the special information obtained before step a) and the updated special information.

In one embodiment of the present invention, the second storage section is provided inside of the recording/reproducing apparatus.

In another embodiment of the present invention, the second storage section is provided outside of the recording/reproducing apparatus.

In still another embodiment of the present invention, the data structure information includes: an object region for storing data which is encrypted using a title key corresponding to a predetermined unit amount of data; a management region for storing management information of the encrypted data; and an encryption region for storing the title key which is encrypted using a system key, the special information is the system key, step b) includes steps of: b1) deleting the moved data from the object region and updating the management information: b2) deleting from the encryption region the encrypted title key which is used for decrypting the moved data: b3) updating the system key, and b4) encrypting the title key using the updated system key.

In still another embodiment of the present invention, the data structure information includes: an object region for storing data which is encrypted using a title key corresponding to a predetermined unit amount of data; a management region for storing management information of the encrypted data; and an encryption region for storing the title key and the management information which are encrypted using a system key, the special information is the system key, step a) includes a step of moving a predetermined amount of content included in the encrypted data from the first storage section to the second storage section, and step b) includes steps of: b1) deleting the moved predetermined amount of content from the object region; b2) updating the management information; b3) updating the system key; and b4) encrypting the title key and the updated management information using the updated system key, the method further includes steps of: c) repeating steps a) and b) until the amount of the moved content becomes equal to the predetermined unit data amount; and d) when the amount of moved content becomes equal to the predetermined unit data amount, deleting from the encryption region the encrypted title key which is used for decrypting the data.

In still another embodiment of the present invention, the method further includes steps of: e) acquiring the system key from the special information holding section; f) decrypting the management information stored in the encryption region using the system key; and g) overwriting the decrypted management information in the management region.

In still another embodiment of the present invention, the data structure information includes: an object region for storing a content which is a part of the encrypted data and which is encrypted using a title key corresponding to the content; and a management region for storing management information of the encrypted content and correspondence information which represents a correspondence between the encrypted content and the title key used for decrypting the encrypted content, the correspondence being established by allocating ID information to the encrypted content, the special information includes the title key to which the ID information is allocated and which is encrypted using a system key, step a) includes a step of moving the encrypted content from the first storage section to the second storage section, and step b) includes steps of: b1) deleting the moved content from the object region; b2) updating the management information: and b3) deleting the encrypted title key which has the same ID information as that allocated to the content deleted at step b1).

In still another embodiment of the present invention, the special information further includes the system key; and step b) further includes a step of updating the system key at every predetermined time and encrypting the title key using the updated system key.

In still another embodiment of the present invention, the data structure information includes: an object region for storing data which is encrypted using a title key corresponding to a predetermined unit amount of data; a management region for storing management information of the encrypted data; and an encryption region for storing the title key which is encrypted using a system key, the special information includes: a first check code which is calculated from the management information; and a second check code which is calculated from the encrypted title key, step a) includes a step of moving a predetermined amount of content included in the encrypted data from the first storage section to the second storage section, step b) includes steps of: b1) deleting the moved predetermined amount of content from the object region b2) updating the management information; and b3) updating the first check code by means of a calculation based on the updated management information, and the method further includes steps of: c) repeating steps a) and b) until the amount of the moved content becomes equal to the predetermined unit data amount; d) when the amount of moved content becomes equal to the predetermined unit data amount, deleting from the encryption region the encrypted title key which is used for decrypting the data; and e) updating the second check code by means of a calculation based on the encrypted title key.

In still another embodiment of the present invention, the special information further includes the system key; and step b) further includes a step of updating the system key and encrypting the title key using the updated system key.

In still another embodiment of the present invention, the method further includes steps of: f) calculating the first check code from the management information; g) determining whether or not the first check code obtained at step f) is identical to the first check code held in the special information holding section; h) if the determination result of step g) indicates "not identical", restricting the controller in controlling the first storage sections but if the determination result of step g) indicates "identical", calculating the second check code from the encrypted title key; i) determining whether or not the second check code obtained at step h) is identical to the second check code held in the special information holding section; and j) if the determination result of step i) indicates "not identical", restricting the controller in controlling the first storage section, but if the determination result of step 1) indicates "identical", allowing the controller to control the first storage section.

According to still another aspect of the present invention, there is provided a method for deleting data from a recording/reproducing apparatus, the recording/reproducing apparatus including: a storage section for storing data structure information which includes encrypted data, the encrypted data including a content which is allowed to be stored for a predetermined time period; a special information holding section for holding special information associated with the data structure information; and a controller for controlling the storage section and the special information holding section, wherein the data structure information and the special information are associated with each other such that the special information is updated in response to an update of the data structure information, or such that the data structure information is updated in response to an update of the special information, the method comprising steps of: a) after a predetermined time period has elapsed, deleting the content from the storage section; and b) updating the special information held in the special information holding section every time step a) is completed such that a mismatch occurs between the special information obtained before step a) and the updated special information.

In one embodiment of the present invention, the data structure information includes: an object region for storing data which is encrypted using a title key corresponding to a predetermined unit amount of data; a management region for storing management information of the encrypted data; and an encryption region for storing the title key which is encrypted using a system keys the special information is the system key, the data is a content which can be stored for a predetermined time period, step b) includes steps of: b1) updating the management information; b2) updating the system key; b3) deleting from the encryption region the encrypted title key which is used for decrypting the content; and b4) encrypting the title key again using the updated system key.

In another embodiment of the present invention, the data structure information includes: an object region for storing data which is encrypted using a title key corresponding to a predetermined unit amount of data; a management region for storing management information of the encrypted data; and an encryption region for storing the title key and the management information which are encrypted using a system key, the special information is the system key, step b) includes steps of: b1) updating the management information; b2) updating the system key; and b3) encrypting the title key and the updated management information using the updated system key, the method further includes, c) repeating steps a) and b) until the amount of the deleted content becomes equal to the predetermined unit data amount; and d) when the amount of deleted content becomes equal to the predetermined unit data amount, deleting from the encryption region the encrypted title key which is used for decrypting the data.

In still another embodiment of the present invention, the data structure information includes: an object region for storing a content which is a part of the encrypted data and which is encrypted using a title key corresponding to the content; and a management region for storing management information of the encrypted content and correspondence information which represents a correspondence between the encrypted content and the title key used for decrypting the encrypted content, the correspondence being established by allocating ID information to the encrypted content, the special information includes the title key to which the ID information is allocated and which is encrypted using a system key, step b) includes steps of: b1) updating the management information; and b2) deleting the encrypted title key which has the same ID information as that allocated to the deleted content.

In still another embodiment of the present invention, the special information further includes the system key; and step b) further includes a step of updating the system key at every predetermined time and encrypting the title key using the updated system key.

In still another embodiment of the present invention, the data structure information includes: an object region for storing data which is encrypted using a title key corresponding to a predetermined unit amount of data; a management region for storing management information of the encrypted data; and an encryption region for storing the title key which is encrypted using a system key, the special information includes: a first check code which is calculated from the management information; and a second check code which is calculated from the encrypted title key, step b) includes steps of: b1) updating the management information; and b2) updating the first check code by means of a calculation based on the updated management information, and the method further includes steps of: c) repeating steps a) and b) until the amount of the deleted content becomes equal to the predetermined unit data amount; d) when the amount of deleted content becomes equal to the predetermined unit data amount, deleting from the encryption region the encrypted title key which is used for decrypting the data; and e) updating the second check code by means of a calculation based on the encrypted title key.

In still another embodiment of the present invention, the special information further includes the system key; and step b) further includes a step of updating the system key and encrypting the title key using the updated system key, thereby updating the encryption region.

Thus, the invention described herein makes possible the advantages of (1) preventing production of an illegal copy and invalidating illegally copied data; (2) preventing production of an illegal copy which may be committed by interrupting a data movement operation and invalidating illegally copied data which may be obtained by interrupting a data transfer operation; and (3) deleting data which is allowed to be stored for a predetermined time period.

These and other advantages of the present invention will become apparent to those skilled in the art upon reading and understanding the following detailed description with reference to the accompanying figures.

BRIEF DESCRIPTION OF THE DRAWINGS

FIG. 22 shows a procedure for imposing a penalty on a fraudulent party.

DESCRIPTION OF THE PREFERRED EMBODIMENTS

First, the principle of the present invention is described. As described above, an objective of the present invention is to prevent illegal copying and invalidate illegally copied data. To this end, data is appropriately controlled before and after movement of data. In the present specification, "data" may be a predetermined unit amount of data, such as a music program including a moving image, a television program, music data, image data, etc.

Figure 5:
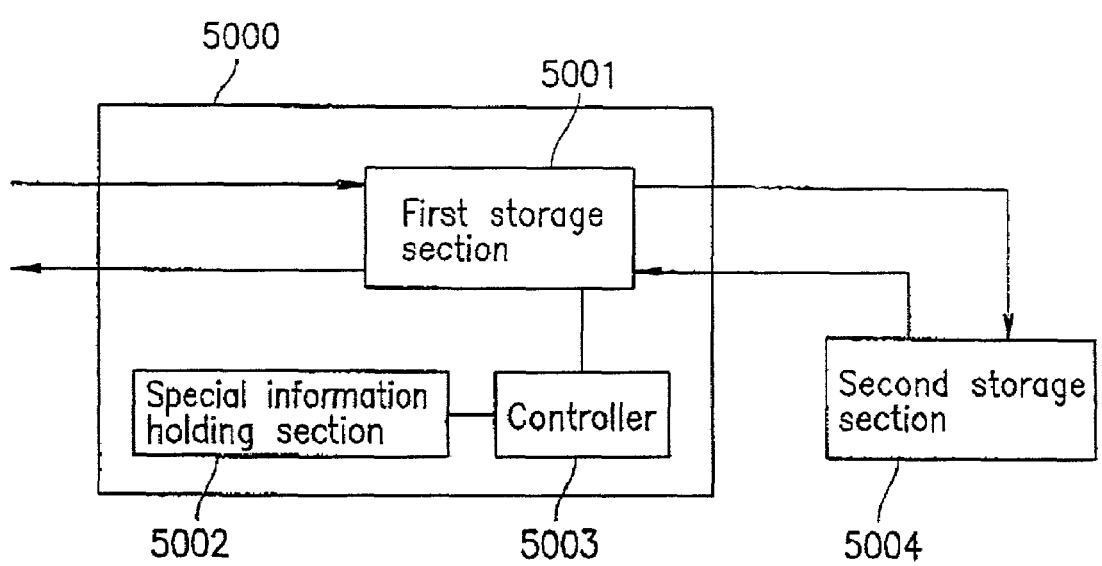
FIG. 5 schematically shows a recording/reproducing apparatus of the present invention

FIG. 5 schematically shows a recording/reproducing apparatus 5000 of the present invention. In FIG. 5, for clearly explaining the principle of the present invention, the components of an actual recording/reproducing apparatus are shown in simplified forms.

The recording/reproducing apparatus 5000 includes: a first storage section 5001; a special information holding section 5002; and a controller (CPU: central processing unit) 5003.

The first storage section 5001 encrypts externally-input data and stores data structure information including the encrypted data. The special information holding section 5002 holds special information which is associated with the data structure information. The controller 5003 controls the first storage section 5001 and the special information holding section 5002. A second storage section 5004 is externally connected to the recording/reproducing apparatus 5000 such that the second storage section 5004 is controlled by the controller 5003. However, the second storage section 5004 may be incorporated in the recording/reproducing apparatus 5000.

According to the above structure, the data structure information and the special information are stored separately, while the data structure information and the special information can be controlled so as to be associated with each other. As a result, the encrypted data of the data structure information cannot be solely encrypted. Therefore, the data structure information can be more securely stored.

Figure 6:
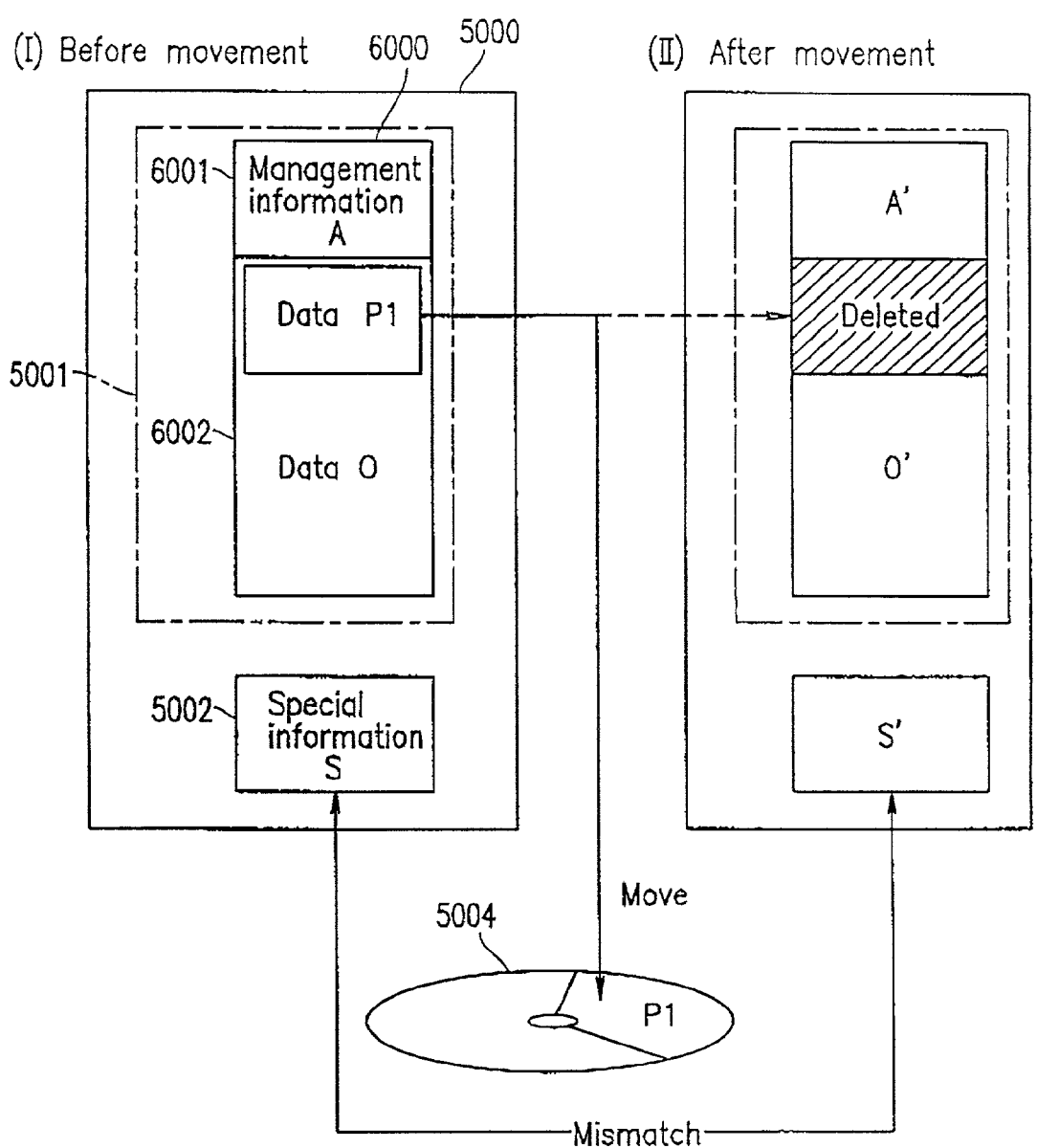
FIG. 6 shows data structure information before and after a data movement operation in the recording/reproducing apparatus of FIG. 5.

FIG. 6 shows the data structure information and the special information before and after a data movement operation in the recording/reproducing apparatus of FIG. 5. In FIG. 6, for simplicity of illustration, only the data structure information stored in the first storage section 5001 and the special information held in the special information holding section 5002 of the recording/reproducing apparatus 5000 are shown.

At pre-movement state, i.e., State (I), the data structure information includes: a management region 6001 for storing management information A, such as address, data size of stored data and use status of the first storage section; and an object region 6002 for storing encrypted data O. The encrypted data O includes data P1. The special information holding section 5002 holds special information S. The special information S is associated with the management information A and/or the encrypted data O.

After the data P1 in the object region 6002 has been moved to the second storage section 5004, the data P1 is deleted from the object region 6002, and the special information S is then updated to special information S'. In response to the update of the special information S, data O is updated to data O', and the management information A is updated to management information A'. Alternatively, in response to the update of data O and the management information A, the special information S may be updated to special information S'.

When the controller 5003 controls the first storage section 5001 and the special information holding section 5002 in the above described manner, the special information held in the special information holding section 5002, which is obtained after the data movement operation, mismatches with (i.e., differs from) the special information held in the section 5002 which is obtained before the data movement operation. In such a case, even if the data structure information 6000 stored in the first storage section 5001 at the pre-movement state, i.e., State (I), is harbored into a personal computer including a separate hard disk, or the like, and then returned to the first storage section 5001 at the post-movement state, i.e., State (II), the special information S, which is associated with the data structure information 6000 at State (I), is no longer present in the recording/reproducing apparatus 5000 at State (II). As a result, the returned data of the data structure information 6000 is invalid at State (II).

Hereinafter, embodiments of the present invention will be described with reference to the drawings. In the following sections of the present specification, an encryption operation is exemplified for describing the embodiments of the present invention. Data to be encrypted (data x) and encrypted data (data x') has the following relationship:

$$Ey(x)=x' \quad (1)$$

$$Dy(x')=Dy(Ey(x))=x \quad (2)$$

where y represents a key used for encryption or decryption. E(t) represents an encryption operation. D(t) represents a decryption operation. Expression (1) means that data x is encrypted using key y so as to obtain data x'. Expression (2) means that the encrypted data x' is decrypted using key y so as to obtain data x.

Embodiment 1

Figure 7:
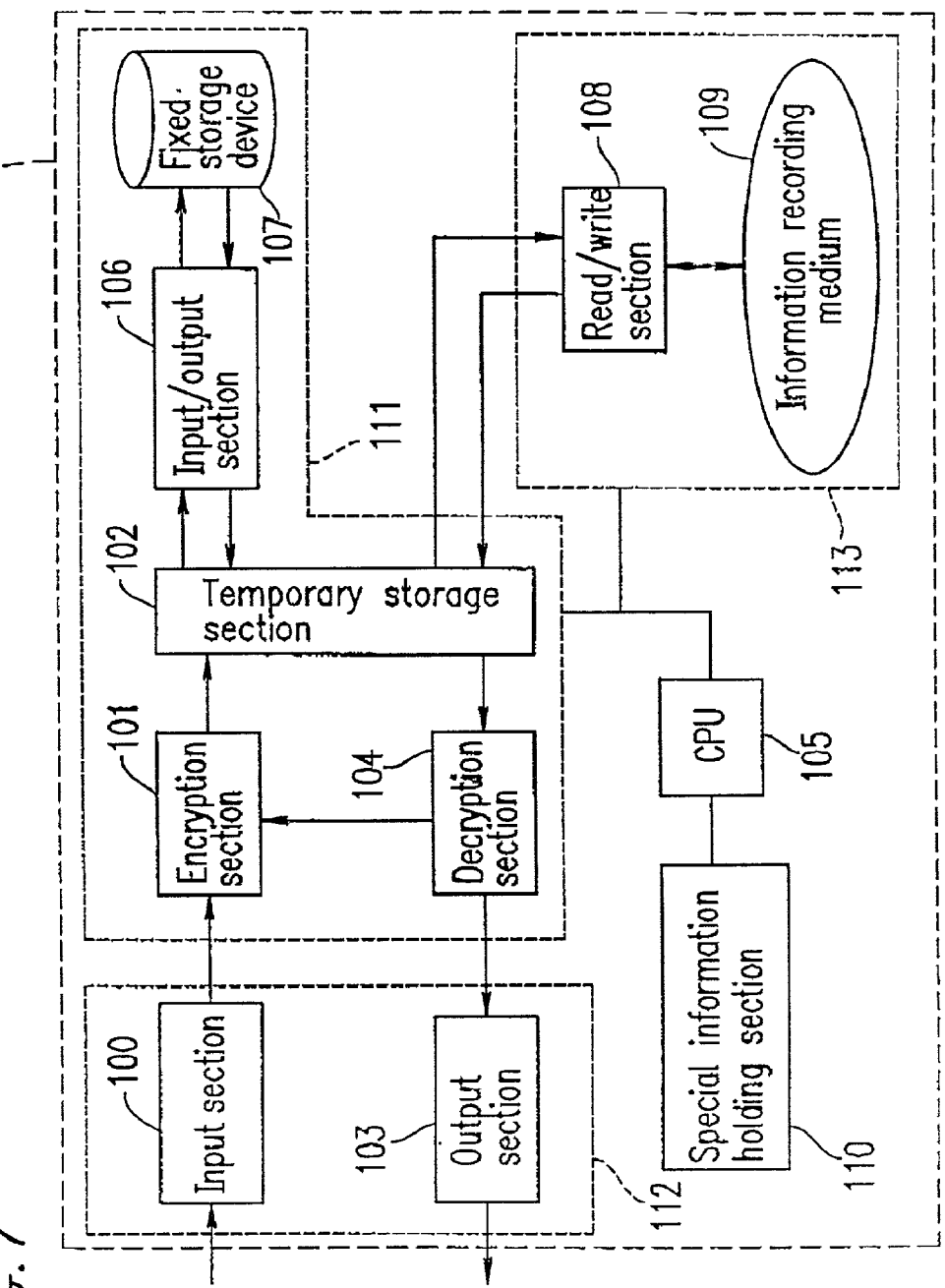
FIG. 7 shows a structure of a recording/reproducing apparatus of the present invention.

FIG. 7 shows a structure of a recording/reproducing apparatus 114 of the present invention. The recording/reproducing apparatus 114 includes: a first storage section 111; a special information holding section 110; a controller 105; an analog/digital input/output section 112; and a second storage section 113.

The analog/digital input/output section 112 includes an input section 100 and an output section 103. The input section 100 converts externally-input analog data into digitally compressed data. The output section 103 converts the digitally compressed data into analog data.

The first storage section 111 includes an encryption section 101; a temporary storage section 102; a decryption section 104; an input/output section 106; and a fixed storage device 107.

If copy generation management information attached to data is free-content information, the encryption section 101 does not perform an encryption process. If the copy generation management information is information indicating that production of a child copy (first generation copy) is permitted, or information that permits storage of data for a predetermined time period, the encryption section 101 changes the copy generation management information into copy prohibition information, and the data is encrypted and stored in the temporary storage section 110.

The temporary storage section 102 is a high speed memory, such as an SDRAM or the like. Since the above described sections work based on different data transfer rates, the temporary storage section 102 is used as buffer means for buffering the transfer rate difference among the sections.

The decryption section 104 decrypts the encrypted data and outputs the decrypted data to the data output section 103.

The input/output section 106 is a communication control means, such as IDE, SCSI, or the like, which controls data transfer to/from the fixed storage device 107, such as a hard disc.

The special information holding section 110 holds special information which is associated with data stored in the fixed storage device 107. The special information holding section 110 cannot be accessed by an external device which is present outside the recording/reproducing apparatus 114.

The second storage section 113 includes a read/write section 108 and an information recording medium 109. The information recording medium 109 may be a portable optical disc, such as a DVD-RAM or the like, a hard disc, etc. The read/write section 108 writes data in and/or reads data from the information recording medium 109.

The controller 105 controls the first storage section 111, the special information holding section 110, and the second storage section 113. The controller 105 may be a central processing unit (CPU).

Figure 8:
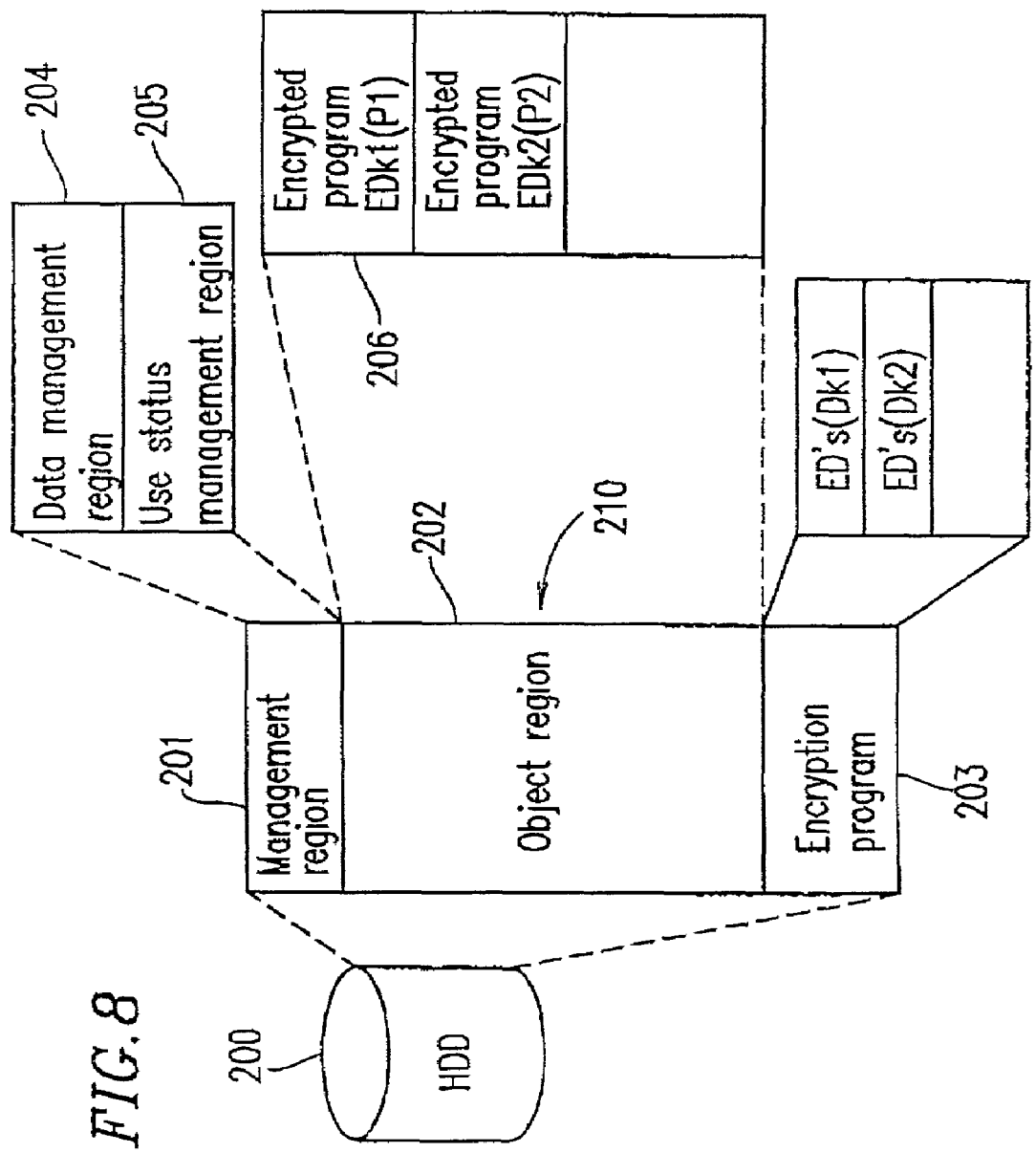
FIG. 8 shows data structure information where data (programs) P1 and P2 are stored in a hard disc.

FIG. 8 shows data structure information where data (programs) P1 and P2 are stored in a hard disc 200.

Next, a recording operation of the recording/reproducing apparatus 114 is described with reference to FIGS. 7 and 8.

The input section 100 externally receives a predetermined amount of analog image unit data P1 (e.g., program P1), such as a broadcast wave or the like, and digitally compresses the analog image data P1 based on MPEG. The compressed image data P1 is transferred to the encryption section 101. If the copy generation management information attached to the compressed image data P1 is the copy prohibition information, the encryption section 101 is controlled by the controller 105 so as to stop a recording operation. If the copy generation management information is information which permits making a first generation copy, or information that permits storage of data for a predetermined time period, the encryption section 101 changes the copy generation management information into copy prohibition information, and encrypts the compressed image data P1 using a title key Dk1 which includes information inherent to the fixed storage device 107 and which corresponds to the predetermined unit amount of data P1. The encrypted data (EDk1(P1)) is transferred to the temporary storage section 102. If copy generation management information is free-content information, the encryption section 101 does not perform an encryption process and transfers the compressed image data P1 as it is to the temporary storage section 102. In the following description, assume that the copy generation management information attached to the input data P1 is information which permits making a first generation copy, or information that permits storage of data for a predetermined time period. The data EDk1(P1) stored in the temporary storage section 102 is moved to, and stored in, the fixed storage device 107 through the input/output section 106. Specifically in this example, the encrypted data EDk1(P1) is stored in the fixed storage device 107 as an encrypted program 206 within an object region 202 of data structure information 210.

Management information, such as a data storage position which is used for reading the encrypted program 206 from the object region 202, a data size, and the use status of the fixed storage device 107, are stored in a management region 201 within the data structure information 210.

The management region 201 includes a data management region 204 and a use status management region 205. The data management region 204 stores a data storage position and a data size. The use status management region 205 stores the use status of the object region 202 (e.g., unused capacity of the object region 202). The management information in the management region 201 is updated every time data comes to the object region 202 and is stored therein.

The title key Dk1, which is necessary for decrypting the encrypted program 206 in a reproduction operation, is encrypted using a system key Ds. The encrypted title key EDs(Dk1) is stored in an encryption region 203 within the data structure information 210. The system key Da used for encrypting the title key Dk1 is stored in the special information holding section 110.

When another data P2 is stored subsequently to the data P1, the data P2 is encrypted using a title key Dk2 which corresponds to the data P2, and stored as the encrypted program EDk2(P2) in the object region 202 where the data PI has been stored. When the data P1 and P2 are stored in the object region 202, all of the data stored in the encryption region 203 (in this example, the encrypted title key EDs (Dk1)) are read out and decrypted using the system key Ds held in the special information holding section 110. After the decryption has been completed, the system key Ds is updated to system key Ds'. Then, the updated system key Ds' is used to encrypt the title keys Dk1 and Dk2. The encrypted title keys EDs' (Dk1) and EDs' (Dk2) are stored in the encryption region 203 again.

A reproduction operation for reproducing data recorded in such a way is substantially the same as that described above with reference to FIG. 1, except that the special information held in the special information holding section 110 is used. Therefore, the description of the reproduction operation is herein omitted.

As described above, a title key which is used for decrypting encrypted data stored in the fixed storage device 107 (the hard disc 200 in FIG. 8) is encrypted by using a system key held in the special information holding section 110 which is separately provided from the fixed storage device 107. With such an arrangement, it is impossible to obtain reproducible data only with data stored in the fixed storage device 107.

1. Data from which Production of First Generation Copy is Permitted

Now, a case where data having data structure information shown in FIG. 8 is moved from the first storage section 111 to the second storage section 113 is described. Data described in this section is data from which production of a first generation copy is permitted.

Figure 9:
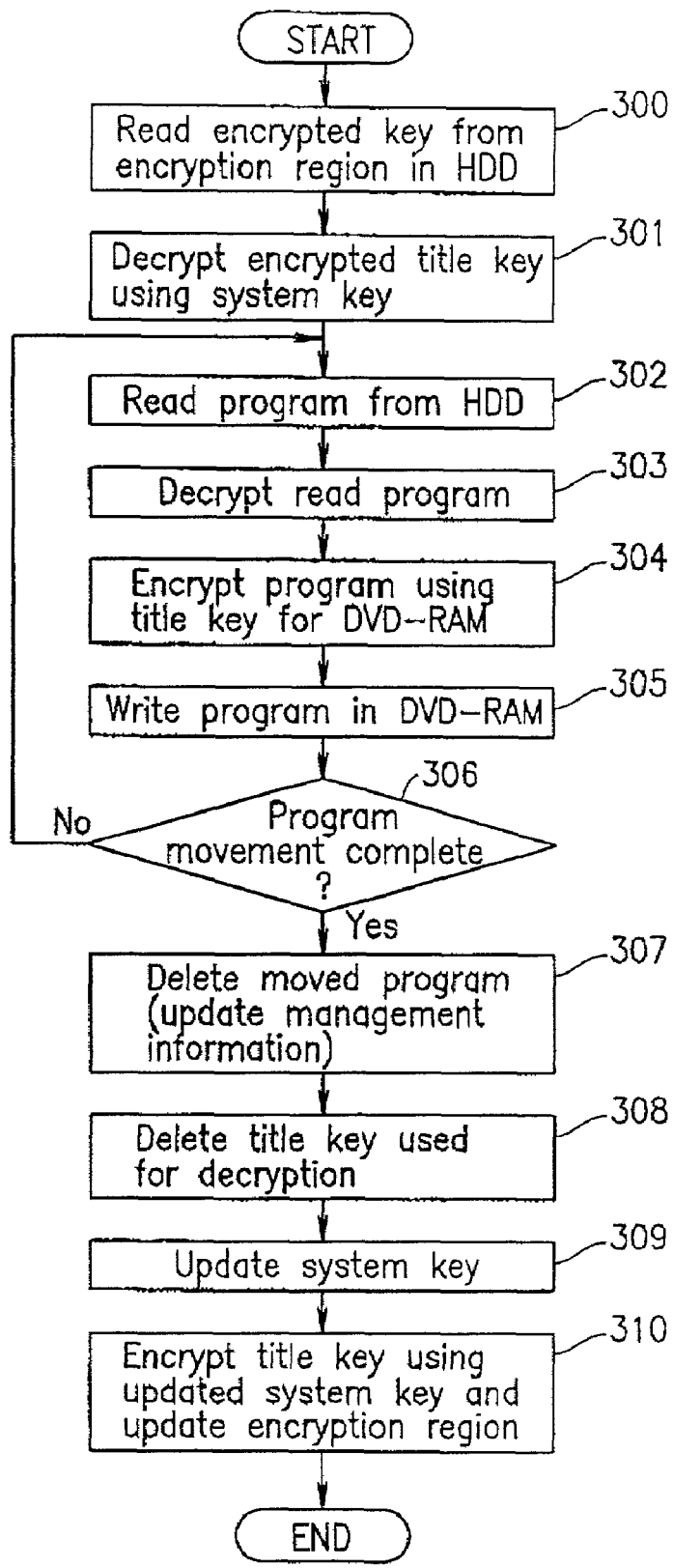
FIG. 9 illustrates a procedure for moving data from a first storage section to a second storage section within the recording/reproducing apparatus of FIG. 7.

FIG. 9 illustrates a procedure for moving data from the first storage section 111 to the second storage section 113 within the recording/reproducing apparatus 114. In this example, assume that the fixed storage device 107 of the first storage section 111 is a hard disc 200; the information recording medium 109 of the second storage section 113 is a DVD-RAM; the predetermined unit amount of data is the program P1; and the program P1 stored in the hard disc 200 as shown in FIG. 8 is moved to the DVD-RAM 109. The program P1 is encrypted using the title key Dk1 and stored in the object region 202 in the hard disk 200.

Step 300:
Encrypted title keys EDs' (Dk1, Dk2) are readout from the encryption region 203.

Step 301:
The system key Ds' which is held in the special information holding section 110 is used to decrypt the encrypted title keys EDs' (Dk1, Dk2) so as to obtain a title key Dk1.

Step 302:
Based on management information stored in the management region 201, the encrypted program EDk1(P1) is read from the hard disc 200 and stored in the temporary storage section 102.

Step 303:
The read program EDk1(P1) is decrypted using the title key Dk1 obtained at step 301 (DDk1(EDk1)(P1))).

Step 304:
The decrypted program P1 is encrypted using a title key Dr which includes information inherent to the DVD-RAM, in order to prevent illegal copying (EDr(P1)).

Step 305:
The encrypted program EDr(P1) is recorded on the DVD-RAM 109.

Through steps 300 to 305, the program P1 is moved to (recorded on) the DVD-RAM 109 from the fixed storage device 107.

Step 306:
Steps 302 to 305 are repeated until all the data of the program P1 is recorded on the DVD-RAM 109.

Step 307:
After all the data of the program P1 has been moved to the DVD-RAM 109, the program P1 is deleted from the object region 202 of the hard disc 107, and the management information (i.e., the management region 204 and the use status management region 205) are updated.

Step 308:
The encrypted title key EDs' (Dk1), which was used for decrypting the program P1, is deleted from the encryption region 203.

Step 309:
The system key Ds' held in the special information holding section 110 is updated to a system key Ds".

Step 310:
The updated system key Ds" is used to encrypt the remaining title keys (EDs" (Dk2)), whereby the encryption region 203 is updated.

Through steps 307 to 310, the program P1 is deleted from the hard disc 200, whereby the data movement from the hard disc 200 to the DVD-RAM 109 is completed.

According to embodiment 1, a mismatch occurs between the special information (system key Ds') obtained before movement of data from the first storage section 111 to the second storage section 113 and the special information (system key Ds") obtained after movement of data from the first storage section 111 to the second storage section 113 (Ds'≠Ds"). Due to this mismatch, even if data is copied (harbored) into another hard disc before the data is moved from the first storage section 111 to the second storage section 113, and the harbored data is returned from the another hard disc to the first storage section 111 after the data has been moved from the first storage section 111 to the second storage section 113, special information which is necessary for decrypting the data is no longer present. Thus, production of a plurality of illegal copies can be prevented, and illegally copied data can be invalidated.

2. Data which is Allowed to be Stored for a Predetermined Time Period

Now, a case where data having data structure information shown in FIG. 8 is deleted from the first storage section 111 is described. Data described in this section is data which is allowed to be stored for a predetermined time period.

Figure 10:
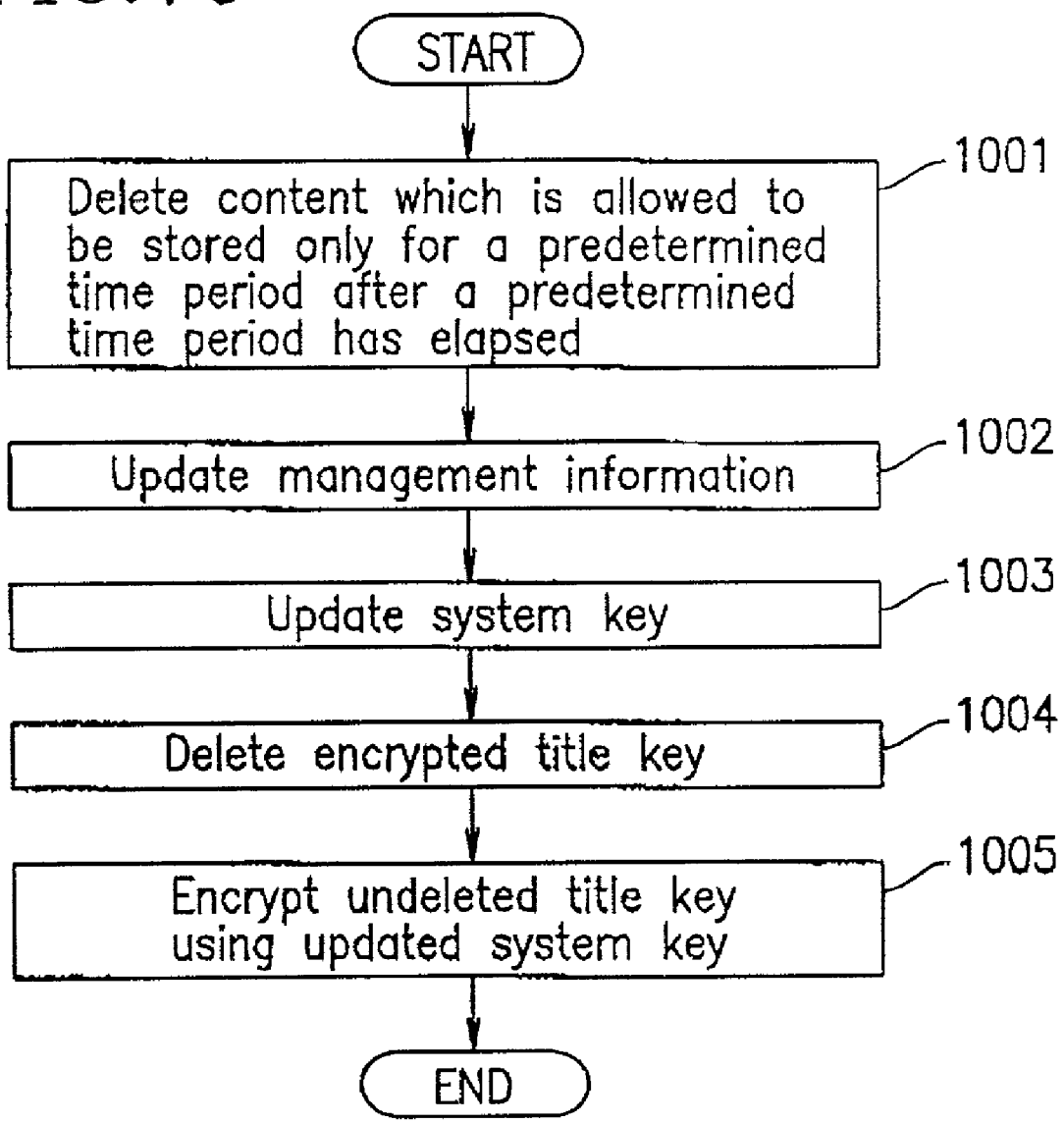
FIG. 10 illustrates a procedure for deleting data from a first storage section of the recording/reproducing apparatus of the present invention.

FIG. 10 illustrates a procedure for deleting data from the first storage section 111 of the recording/reproducing apparatus of the present invention. In this example, assume that the fixed storage device 107 of the first storage section 111 is a hard disc 200; the program P1 (the predetermined unit amount of data) is content which is allowed to be stored for a predetermined time period; and the program P1 stored in the hard disc 200 as shown in FIG. 8 is deleted from the hard disc 200 after a predetermined time period has elapsed. The program P1 is encrypted using the title key Dk1 and stored in the object region 202 in the hard disk 200.

Step 1001:
After a predetermined time period has elapsed, content which is allowed to be stored for a predetermined time period is deleted from the first storage section 111.

Step 1002:
Management information is updated.

Step 1003:
A system key held in the special information holding section 110 is updated.

Step 1004:

An encrypted title key which is used for decrypting the deleted content is deleted from the encryption region 203.

Step 1005:

The system key Ds" updated at step 1003 is used to encrypt the remaining title keys in the encryption region 203 (in this example, Dk2).

According to embodiment 1, a mismatch occurs between the special information (system key Ds') obtained before deletion of data from the first storage section 111 and the special information (system key Ds") obtained after deletion of data from the first storage section 111 (Ds'≠Ds"). Due to this mismatch, even if data is copied (harbored) into another hard disc before the data is deleted from the first storage section 111, and the harbored data is returned from the another hard disc to the first storage section 111 after the data is deleted from the first storage section 111, special information which is necessary for decrypting the data is no longer present. Thus, production of a plurality of illegal copies can be prevented, and illegally copied data can be invalidated. That is, the data which is allowed to be stored for a predetermined time period is deleted with certainty.

Figure 1:
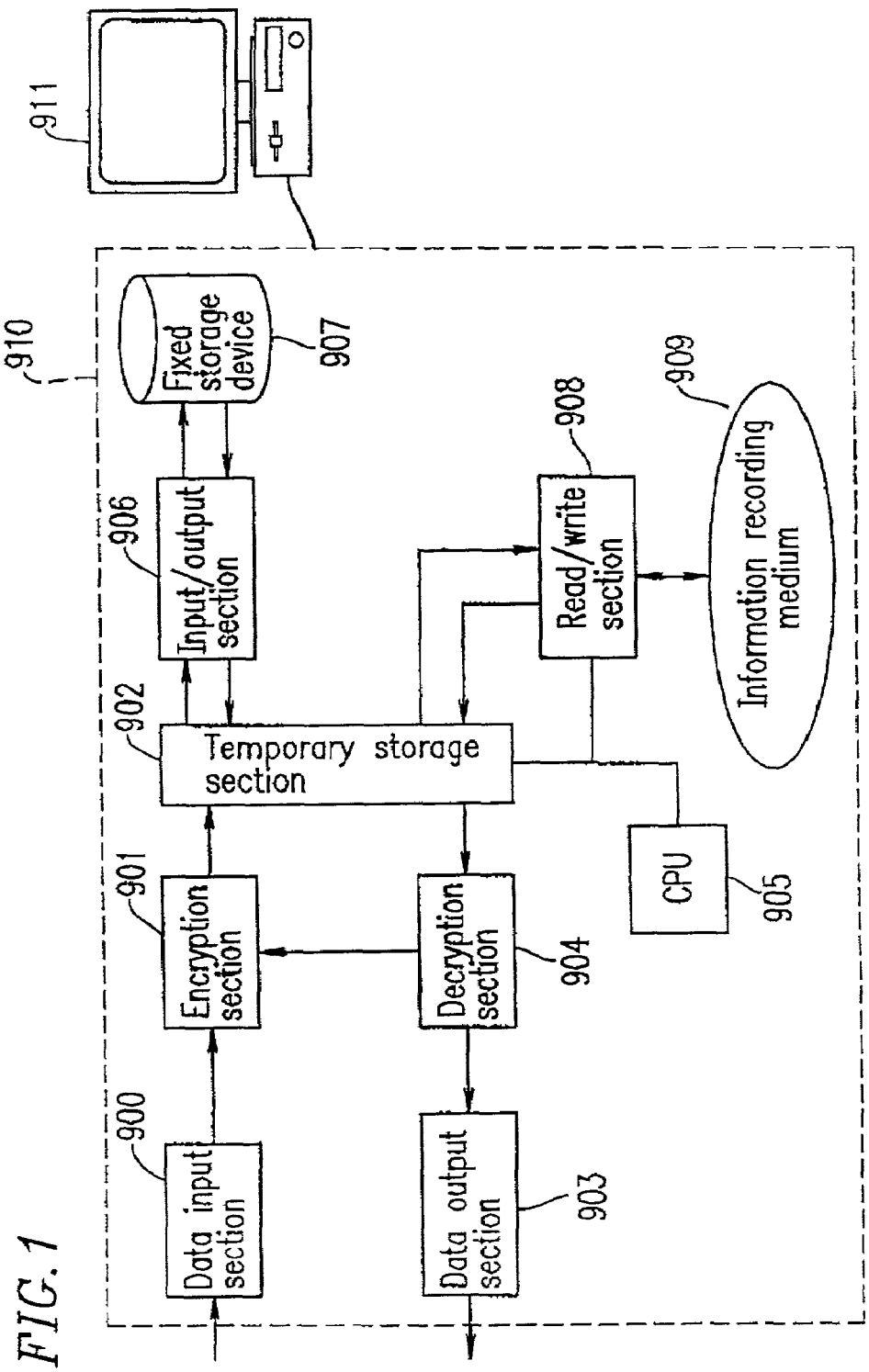
FIG. 1 shows a structure of a conventional video recording/reproducing apparatus.
Figure 2:
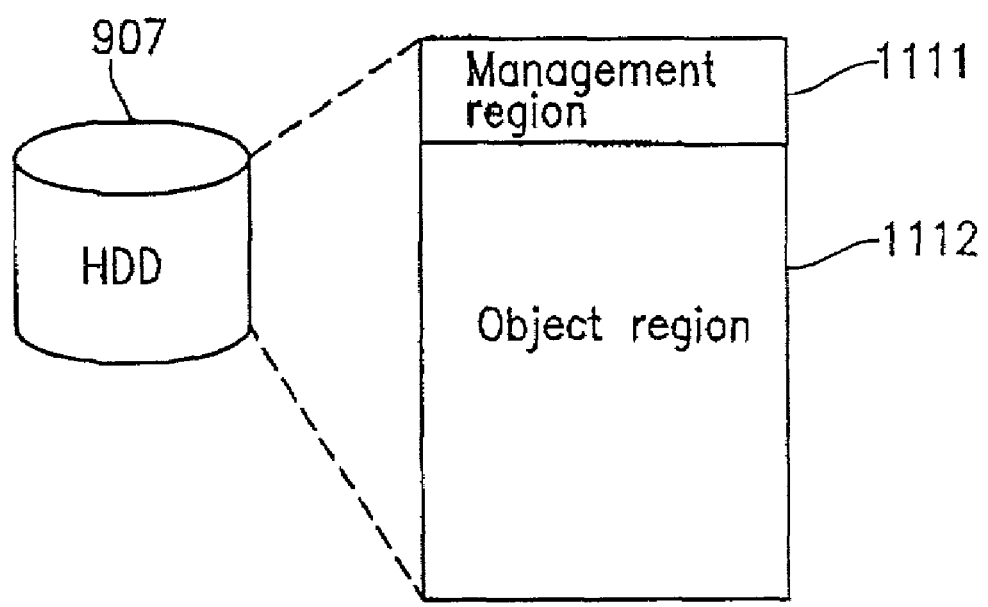
FIG. 2 shows a structure of a conventional fixed storage device.
Figure 3:
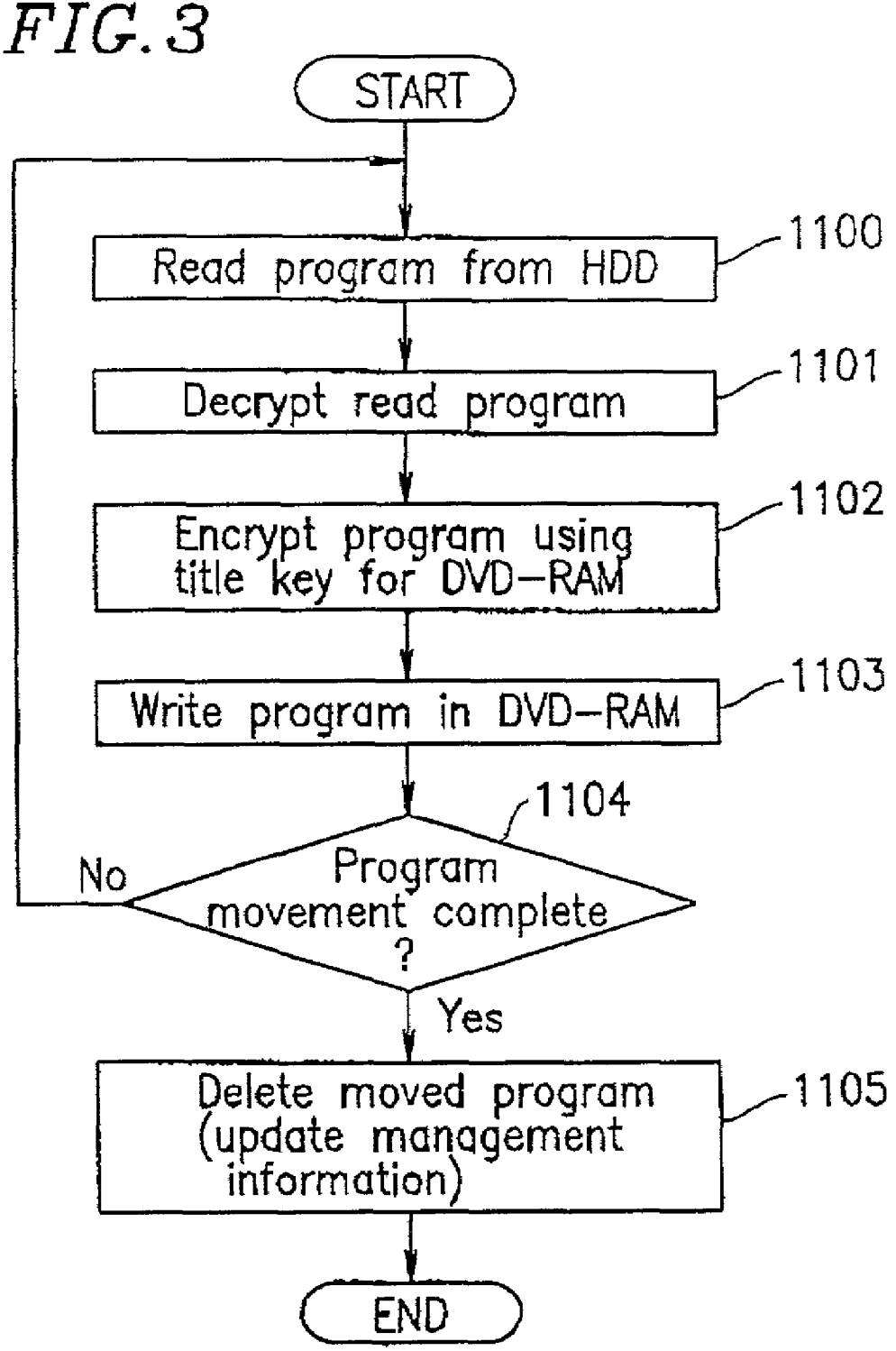
FIG. 3 illustrates a procedure for moving data from a fixed storage device to an information recording medium in the conventional video recording/reproducing apparatus of FIG. 1.
Figure 4:
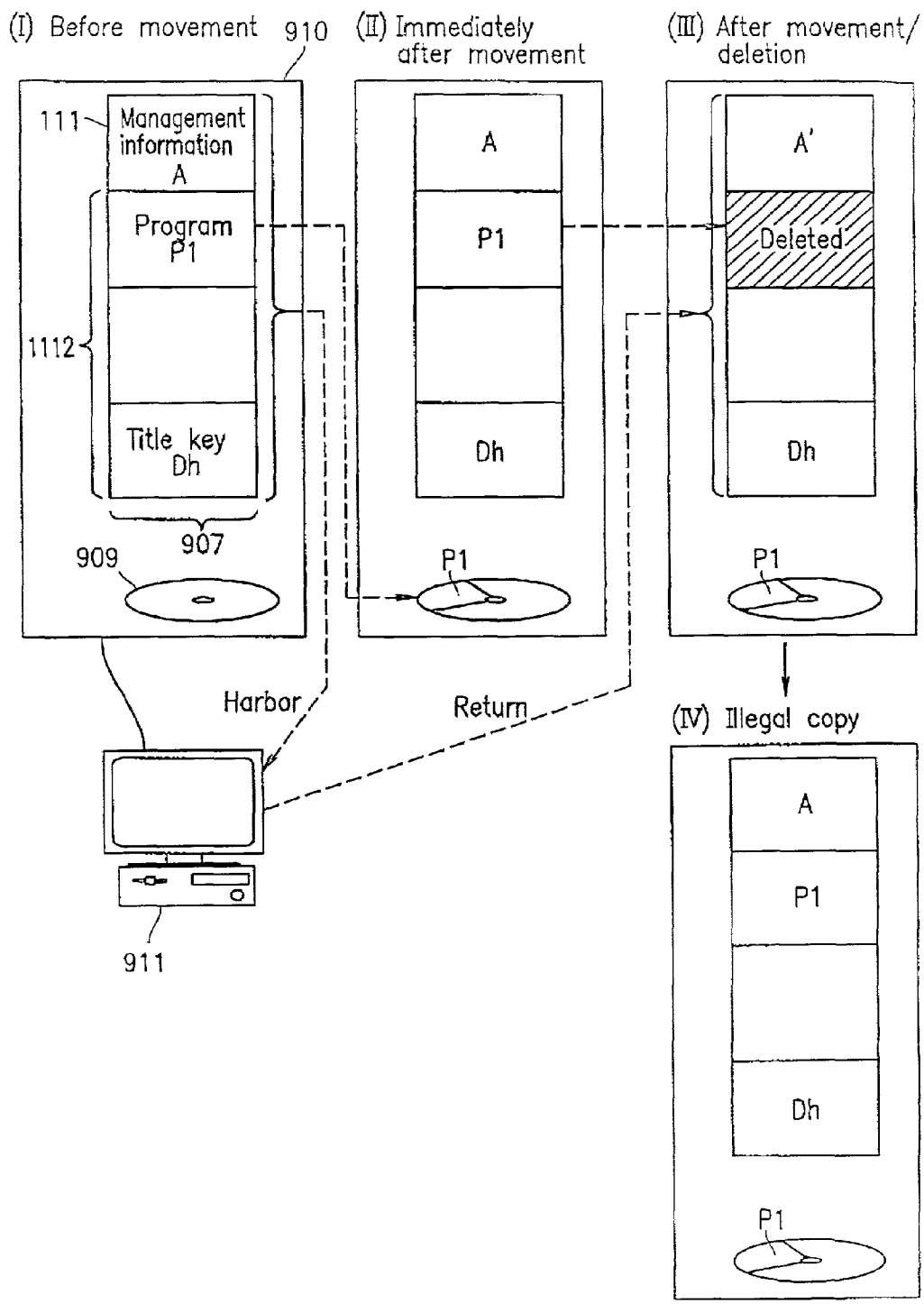
FIG. 4 shows the inside states of the fixed storage device and the information recording medium during a data movement operation.

The recording/reproducing apparatus of the present invention is not limited to the recording/reproducing apparatus 114 shown in FIG. 1.

Figure 11:
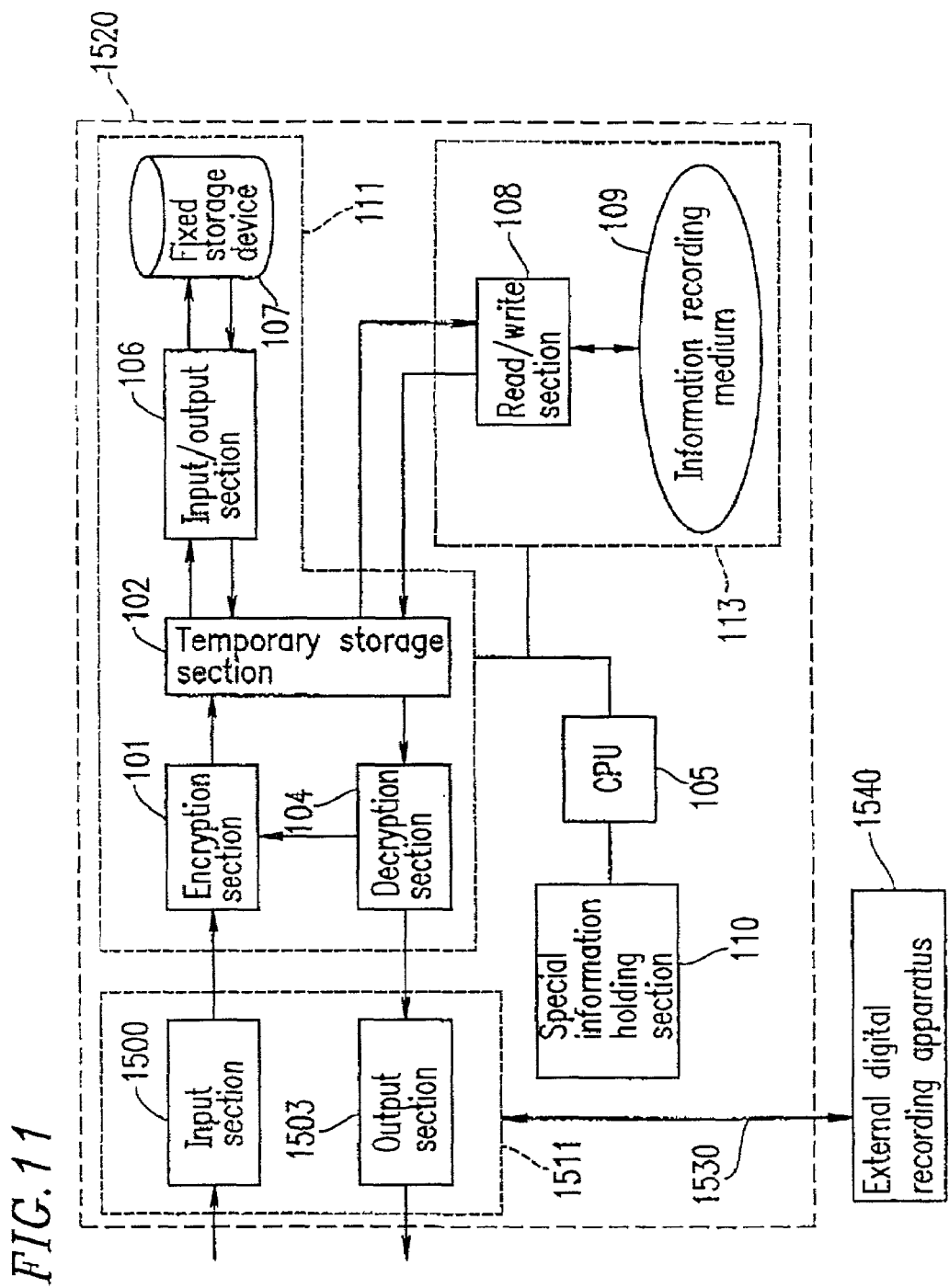
FIG. 11 shows a structure of a recording/reproducing apparatus of the present invention, outside of which another storage section is provided.

FIG. 11 shows a recording/reproducing apparatus 1520 of the present invention, outside of which another storage section is provided.

In this example, the recording/reproducing apparatus 1520 has substantially the same structure as that of the recording/reproducing apparatus 114 of FIG. 7, except that an external digital recording apparatus 1540 is attached as another storage section to the recording/reproducing apparatus 1520. In FIG. 11, like elements are indicated by like reference numerals used in FIG. 7, and detailed descriptions thereof are omitted.

An analog/digital input/output section 1511 includes an input section 1500 and an output section 1503. The input section 1500 converts analog data, which is input from the external digital recording apparatus 1540 and/or input from an external device different from the external digital recording apparatus 1540 (e.g., a television monitor), into digitally compressed data. The output section 1503 converts digitally compressed data into analog data, and moves the analog data from the first storage section 111 to the external digital recording apparatus 1540 and/or an external device different from the external digital recording apparatus 1540.

The analog/digital input/output section 1511 and the external digital recording apparatus 1540 are connected via a digital interface 1530, such as an IEEE1394 or the like.

Also in the recording/reproducing apparatus 1520 of FIG. 11, as well as in the recording/reproducing apparatus 114 of FIG. 7, data can be moved from the first storage section 111 to the external digital recording apparatus 1540 while preventing illegal copying.

In another embodiment of the present invention, although not shown, the digital recording apparatus 1540 may be provided outside of the recording/reproducing apparatus 1520 and used as a substitute for the second storage section 113 shown in FIGS. 7 and 11.

Hereinafter, embodiments 2-6 of the present invention are described. Each of embodiments 2-6 can be achieved using one of the recording/reproducing apparatuses shown in FIGS. 7 and 11.

Embodiment 2

Figure 12:
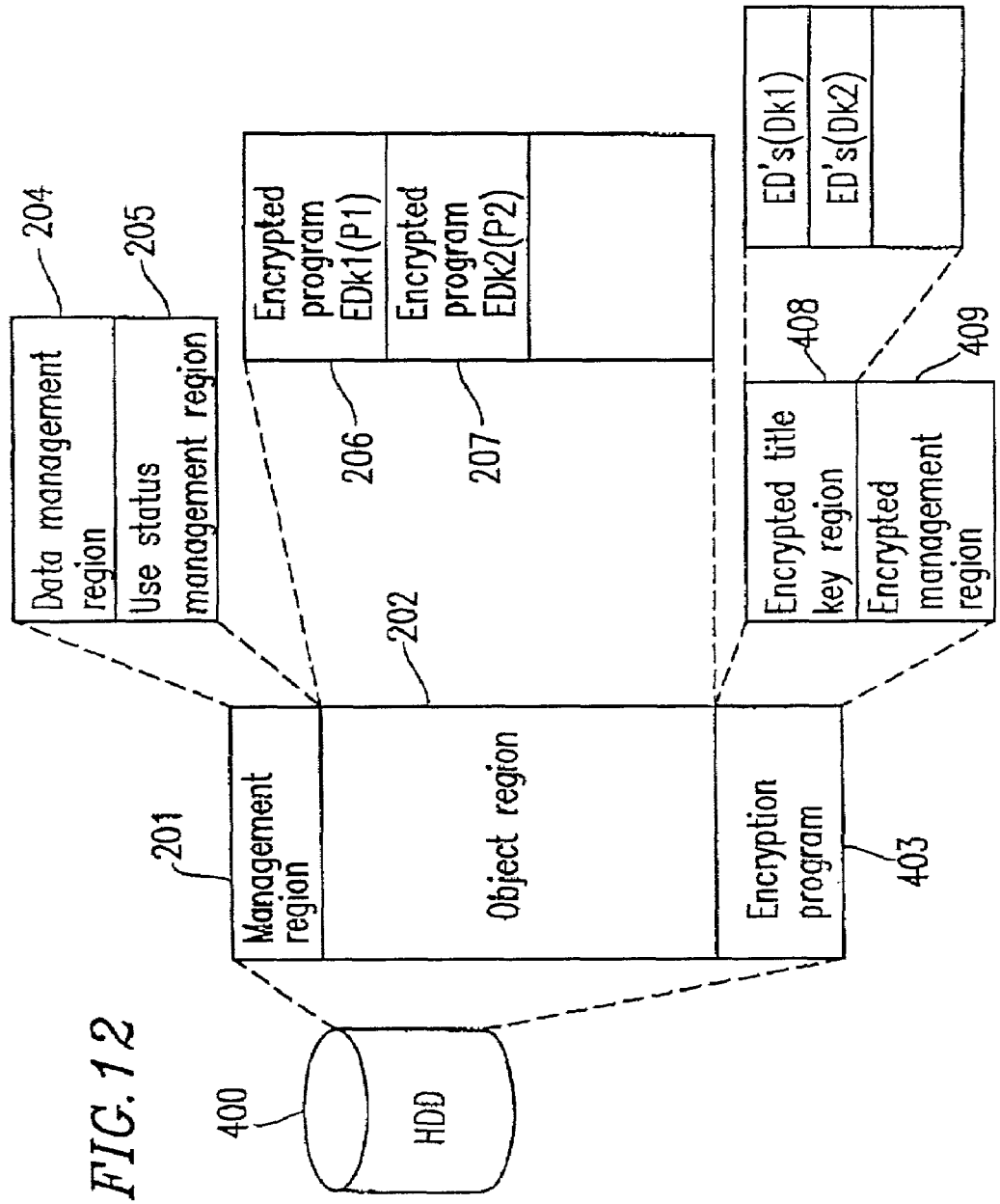
FIG. 12 shows data structure information, where data (programs) P1 and P2 are stored in a fixed storage device.

FIG. 12 shows data structure information where data (programs) P1 and P2 are stored in a fixed storage device 107. The data structure information includes a management region 201, an object region 202, and an encryption region 403. In FIG. 12, like elements are indicated by like reference numerals used in FIG. 8, and detailed descriptions thereof are omitted.

The data structure information shown in FIG. 12 is different from that shown in FIG. 8, in that the encryption region 403 includes an encrypted title key region 408 and an encryption management region 409. The encrypted title key region 408 stores a title key which is encrypted using a system key Ds' held in the special information holding section 110 and which is used for encrypting data P1 and P2. The encryption management region 409 stores management information which is encrypted using the system key Ds' held in the special information holding section 110 and which is stored in the management region 201. The other components of the recording/reproducing apparatus of embodiment 2 are the same as those described in embodiment 1, and detailed descriptions thereof are omitted. Further, recording and reproducing operations of the recording/reproducing apparatus of embodiment 2 are the same as those described in embodiment 1, and detailed descriptions thereof are omitted.

1. Data from which Production of First Generation Copy is Permitted

Now, a case where data having data structure information shown in FIG. 12 is moved from the first storage section 111 to the second storage section 113 (see FIG. 7 or 11) is described. Data described in this section is data from which production of a first generation copy is permitted.

Figure 13:
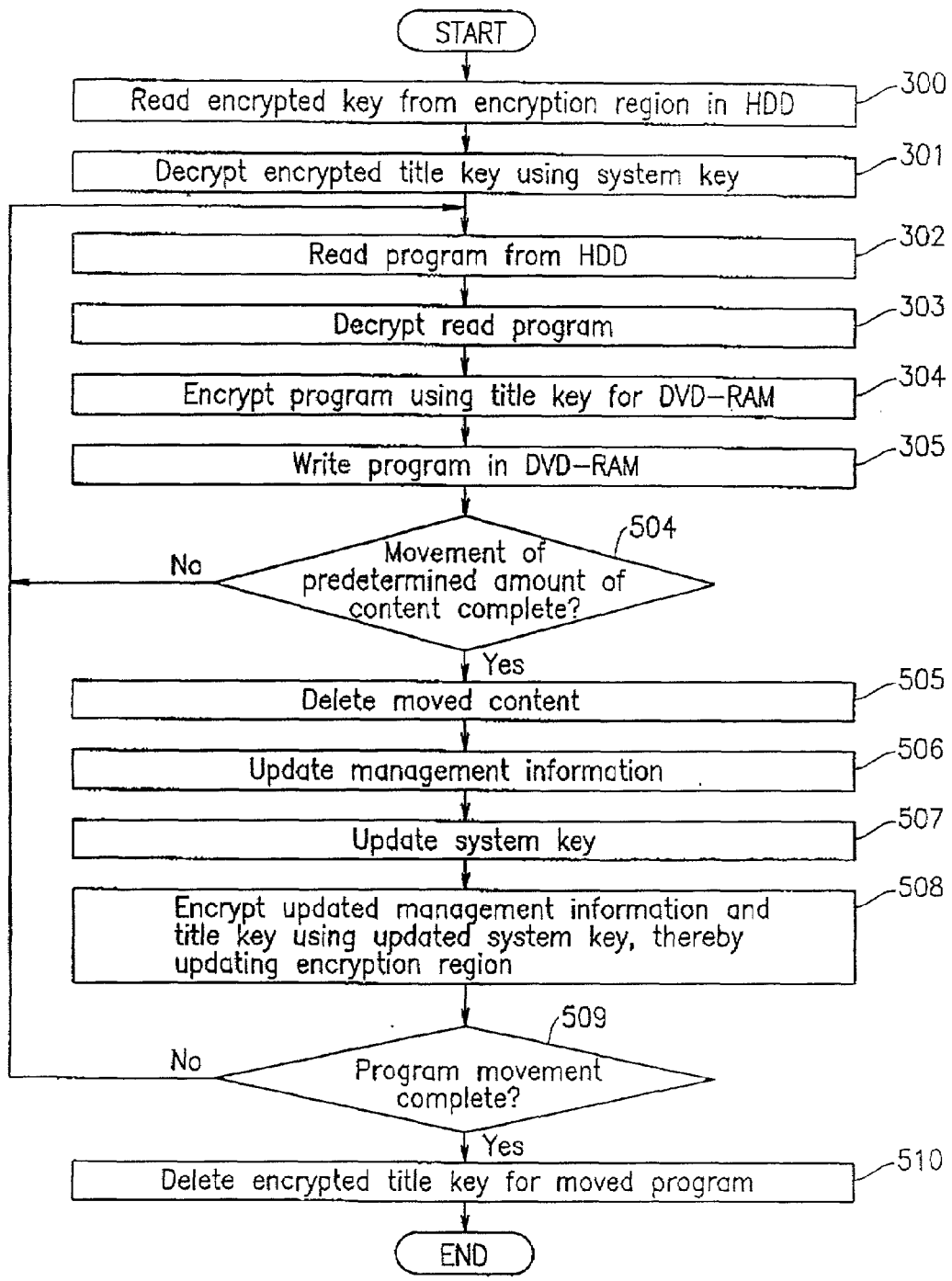
FIG. 13 illustrates a procedure for moving data from a first storage section to a second storage section within a recording/reproducing apparatus of the present invention.

FIG. 13 illustrates a procedure for moving data from the first storage section 111 to the second storage section 113 within the recording/reproducing apparatus of the present invention(see FIG. 7 or 11). In this example, assume that the fixed storage device 107 of the first storage section 111 is a hard disc 400, the information recording medium 109 of the second storage section 113 is a DVD-RAM; the predetermined unit amount of data is the program P1; and the program P1 stored in the hard disc 400 as shown in FIG. 12 is moved to the DVD-RAM 109. The program P1 is encrypted using the title key Dk1 and stored in the object region 202 in the hard disk 400. In embodiment 3, steps for writing in the DVD-RAM a predetermined amount of content included in the program P1 shown in FIG. 13 are the same as steps 300-305 shown in FIG. 9. Thus, description of these steps are not herein omitted note that the "predetermined amount of contents" may be video data having the reproduction length of about three minutes, for example.

Step 504:

Steps 302 to 305 are repeated until all of the predetermined amount of content contained in the program P1 is moved to (recorded on) the DVD-RAM 109.

Step 505:

After all of the predetermined amount of content contained in the program P1 has been moved to the DVD-RAM 109, the predetermined amount of content contained in the program P1 is deleted from the object region 202 of the hard disc 400.

Step 506:

The management information (i.e., the management region 204 and the use status management region 205) are updated.

Step 507:

The system key Ds' held in the special information holding section 110 is updated to a system key Ds".

Step 508:

The updated system key Ds" is used to encrypt the title keys Dk1 and Dk2 and the updated management information, whereby the encryption region 403 is updated.

Step 509:

Steps 302 to 305 and steps 504-508 are repeated until the data amount of the moved content becomes equal to a predetermined unit data amount.

Step 510:

When the data amount of the moved content becomes equal to the amount of the program P1 (the predetermined unit data amount), the encrypted title key EDS" (Dk1), which was used for decrypting the program P1, is deleted from the encryption region 403.

Through steps 300 to 305 and steps 504-510, the program P1 is moved to (recorded on) the DVD-RAM 109 from the hard disc 400, and the program P1 is deleted from the hard disc 400, whereby the data movement from the hard disc 400 to the DVD-RAM 109 is completed.

According to embodiment 2, a mismatch occurs between the special information (system key Ds') obtained before movement of the predetermined amount of content among the predetermined unit amount of data from the first storage section 111 to the second storage section 113 and the special information (system key Ds") obtained after movement of the predetermined amount of content among the predetermined unit amount of data from the first storage section 111 to the second storage section 113 (Ds'≠Ds"). Further, the system key is updated every time a predetermined amount of content are moved from the first storage section 111 to the second storage section 113, and the updated system key is used to encrypt the title key and the management region. With such arrangements, the data can be controlled by units of a smaller amount of data. Therefore, illegal copying of a smaller amount of data can be prevented.

Furthermore, even if data movement is interrupted by disconnecting the power supply to the recording/reproducing apparatus before completion of data movement from the first storage section 111 to the second storage section 113, the data deleted from the first storage section 111 cannot be restored because the management information associated with the data which has already been moved to the second storage section 113 and deleted from the first storage section 111 cannot be obtained.

According to the present invention, if the special information holding section 110 has a sufficient capacity for holding a large amount of data, the data which was stored in the encryption region 403 in the above example may be stored in the special information holding section 110. In such a case, the data is secretly kept within the recording/reproducing apparatus, so that the security against illegal data processing can be improved.

2. Data which is Allowed to be Stored for a Predetermined Time Period

Now, a case where data having data structure information shown in FIG. 12 is deleted from the first storage section 111 (see FIG. 7 or 11) is described. Data described in this section is data which is allowed to be stored for a predetermined time period.

Figure 14:
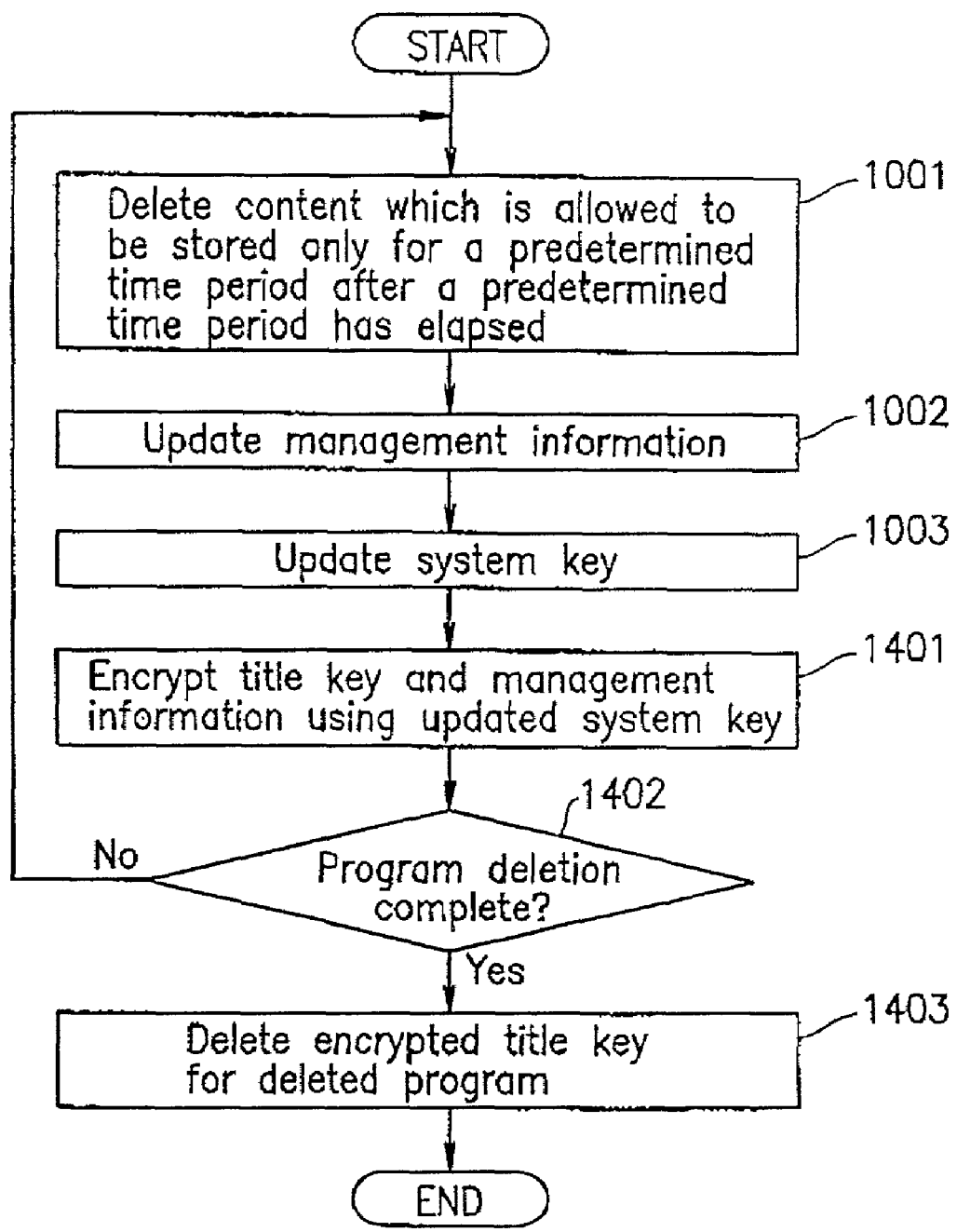
FIG. 14 illustrates a procedure for deleting data from a first storage section of a recording/reproducing apparatus of the present invention.

FIG. 14 illustrates a procedure for deleting data from the first storage section 111 of the recording/reproducing apparatus of the present invention (see FIG. 7 or 11). In this example, assume that the fixed storage device 107 of the first storage section 111 is a hard disc 400; the predetermined unit amount of data is the program P1; and the program P1 stored in the hard disc 400 as shown in FIG. 12 is deleted from the hard disc 400 after a predetermined time period has elapsed. The program P1 includes a plurality of contents which can be stored for a predetermined time period. Steps 1001-1003 shown in FIG. 14 are the same as Steps 1001-1003 of FIG. 10. Therefore, descriptions of these steps are herein omitted.

Step 1401:

The system key Ds" updated at step 1003 is used to encrypt the title keys Dk1 and Dk2 and the updated management information, whereby the encryption region 403 is updated.

Step 1402:

Steps 1001-1401 are repeated until the amount of the deleted contents becomes equal to the predetermined unit data amount, i.e., the data amount of the program P1.

Step 1403:

When the amount of the deleted contents becomes equal to the predetermined unit data amount, i.e., the data amount of the program P1, the encrypted title key EDs"(Dk1) which is used for decrypting the program P1 is deleted from the encryption region 403.

According to embodiment 2, a mismatch occurs between the special information (system key Ds') obtained before deletion of a predetermined amount of content from the first storage section 111 and the special information (system key Ds") obtained after deletion of a predetermined amount of content from the first storage section 111 (Ds'≠Ds"). Due to this mismatch, even if a predetermined amount of content is copied (harbored) into another hard disc before the predetermined amount of content is deleted from the first storage section 111, and the harbored content is returned from the another hard disc to the first storage section 111 after a predetermined time period has elapsed and the predetermined amount of content is deleted from the first storage section 111, special information which is necessary for decrypting the predetermined amount of content is no longer present. Thus, production of a plurality of illegal copies can be prevented, and illegally copied data can be invalidated. That is, the data which is allowed to be stored for a predetermined time period can be surely deleted. Furthermore, since the predetermined amount of contents is smaller than the predetermined unit data amount, the security against illegal data processing is higher in embodiment 2 than in embodiment 1.

Embodiment 3

Figure 15:
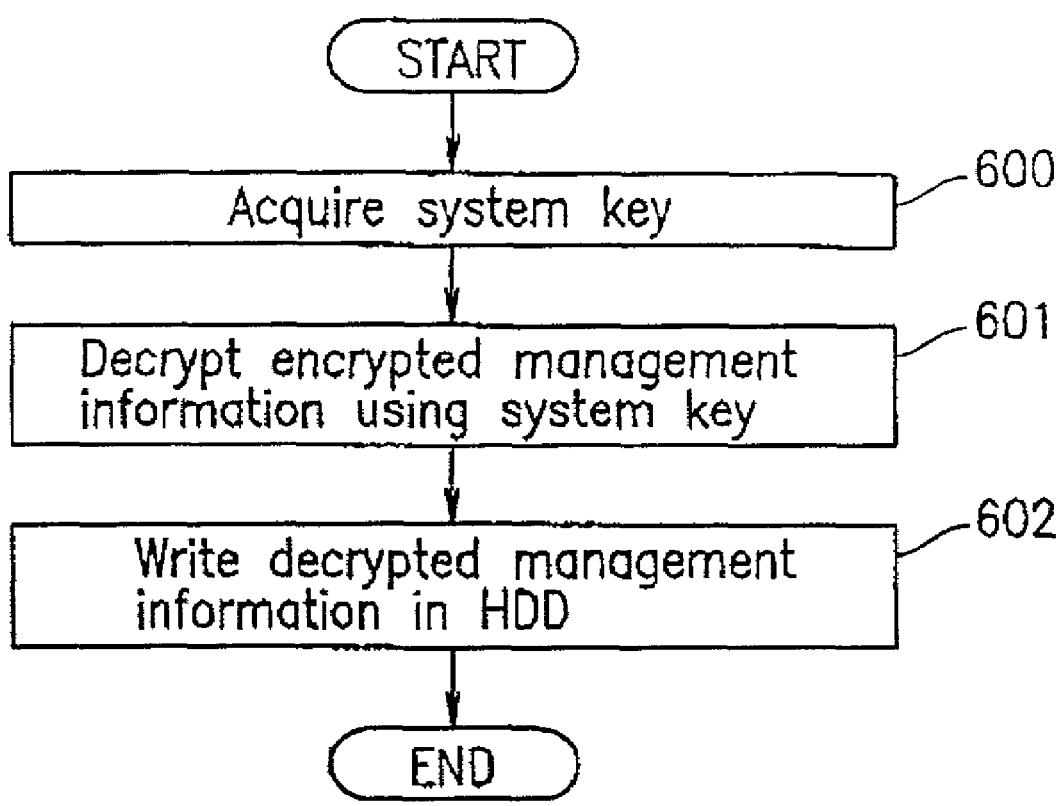
FIG. 15 shows a procedure for imposing a penalty on a fraudulent party.

FIG. 15 shows a procedure for imposing a penalty on a fraudulent party. Embodiment 3 is realized in the recording/reproducing apparatus (for example, the recording/reproducing apparatus 114 (FIG. 7) or the recording/reproducing apparatus 1520 (FIG. 11)) which records/reproduces data having the data structure information according to embodiment 2 (shown in FIG. 12). In embodiment 3, the fixed storage device 107 of the first storage section 11 is the hard disc 400 of FIG. 12. The hard disc 400 includes the data structure information as shown in FIG. 12.

Hereinafter, steps of the procedure for imposing a penalty on a fraudulent party are described with reference to FIG. 15.

Step 600:

The system key Ds" is acquired from the special information holding section 110 immediately after the start-up of the recording/reproducing apparatus.

Step 601:

The system key Ds" is used to decrypt the encrypted management information stored in the encryption management region 409 within the encryption region 403.

Step 602:

The decrypted management information is written in the management region 201, and the management region 201 is updated.

In the arrangement of embodiment 3, assume that a fraudulent party illegally copies data structure information associated with the system key Ds' into another hard disc before a data movement operation and returns the data structure information to the hard disc 400 in the recording/reproducing apparatus after the data movement operation. Encrypted management information in the encryption region 403 is decrypted using an updated system key Ds", which is different from a system key Ds' that was used for encrypting the management information, whereby the management region 201 is updated. As a result, the encrypted management information is decrypted using the updated system key Ds" which is irrelevant thereto, so that the management region 201 is broken. Accordingly, the fraudulent party has to restore the management region 201 by formatting the hard disc 400 or a like measure. That is, such a penalty is imposed on the fraudulent party.

Alternatively, assume that, after a predetermined amount of content included in a predetermined unit amount of data has been deleted, a fraudulent party restores the deleted predetermined amount of content so as to obtain a predetermined unit amount of data. Since, according to embodiment 3, the encryption region 403 including the management information is updated every time a predetermined amount of content is moved, the management information not indicating that the predetermined amount of content deleted therefrom is overwritten in the management region 201 by performing steps 600-602 at the start-up of the recording/reproducing apparatus. As a result, restoration of the deleted predetermined amount of content can be prevented.

Embodiment 4

Figure 16:
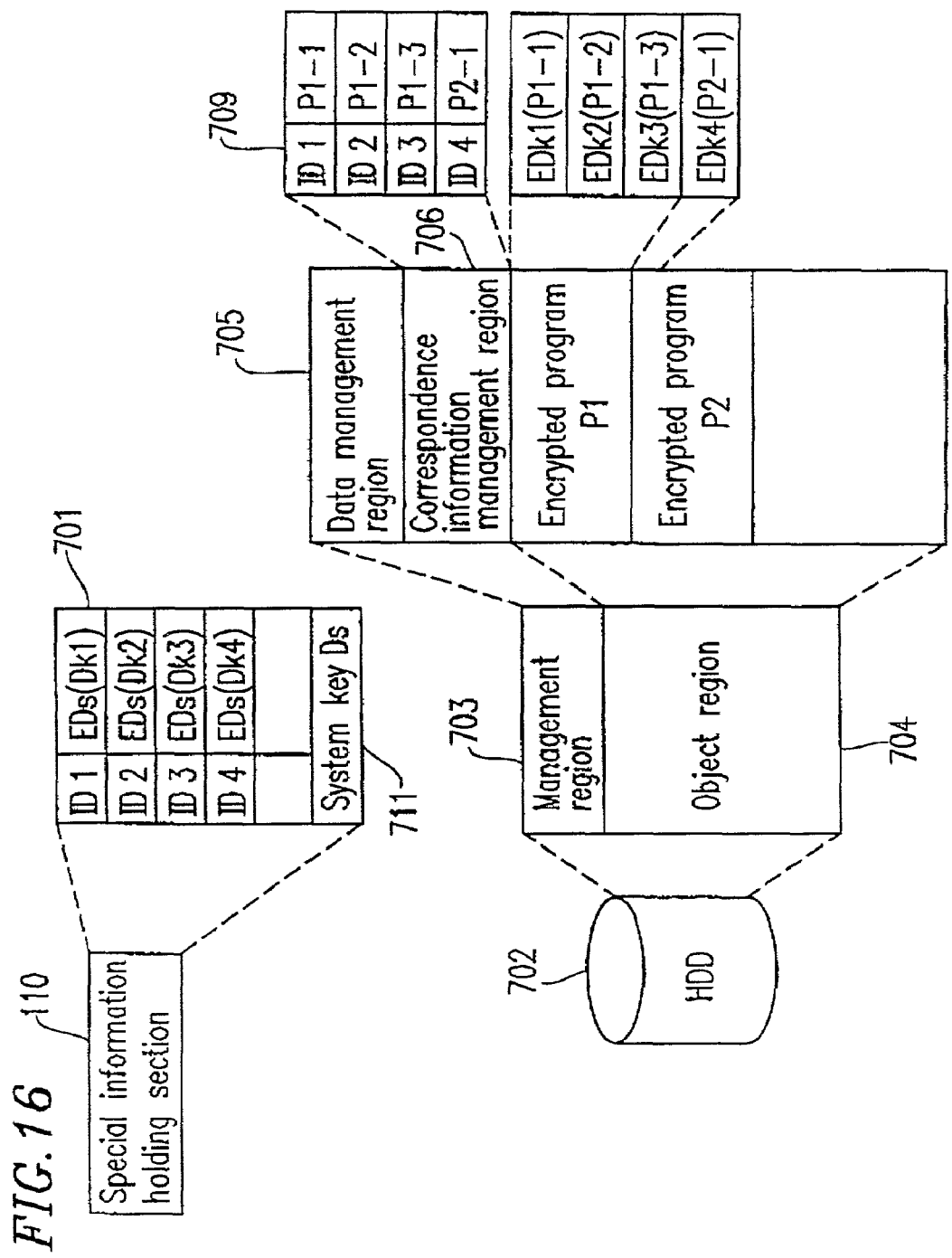
FIG. 16 shows data structure information including data (program) P1 and P2, which is stored in a fixed storage device, and special information held in a special information holding section.

FIG. 16 shows data structure information including data (program) P1 and P2, which is stored in the fixed storage device 107 (see FIG. 7 or 11), and special information held in the special information holding section 110. Embodiment 4 differs from embodiments 1-3 in that a plurality of title keys are used to encrypt a predetermined unit amount of data, and the title keys and identification (ID) information allocated thereto are held in the special information holding section 110. The other details of recording and reproducing operations of the recording/reproducing apparatus according to embodiment 4 are the same as those of embodiment 1, and therefore are not herein described.

The data structure information includes a management region 703 and an object region 704.

The object region 704 stores encrypted data (for example, programs P1 and P2). The program P1 includes a plurality of contents (for example, P1-1, P1-2, and P1-3). Different keys are used for encrypting the respective contents.

The management region 703 stores a data management region 705 and a correspondence information management region 706. The data management region 705 stores a data storage position and a data size. The correspondence information management region 706 stores correspondence information 709 which represents the correspondence between encrypted contents and title keys used for encrypting the encrypted contents. The correspondence is established by allocating ID information to each of the encrypted contents. Every time a content is encrypted, ID information is allocated to the encrypted content for identifying the encrypted content.

The special information holding section 110 holds a system key 711, and a title key 701 which is encrypted using the system key 711 and which has ID information. The system key 711 is updated by the controller 105 at a predetermined time interval (for example, every 3 minutes). The updated system key 711 is then used to encrypt the title key 701. When a new ID information is given to the correspondence information 709, the new ID information is allocated to the encrypted title key 701, and the encrypted title key 701 with the ID information is stored in the special information holding section 110.

In embodiment 4, as described above, a title key, which is used for decrypting encrypted data stored in the fixed storage device 107, is stored in the special information holding section 110, which is provided separately from the fixed storage device 107. With such an arrangement, it is impossible to obtain reproducible data only from the data stored in the fixed storage device 107. Thus, a higher level of protection can be achieved as compared to embodiments 1-3.

1. Data from which Production of First Generation Copy is Permitted

Figure 17:
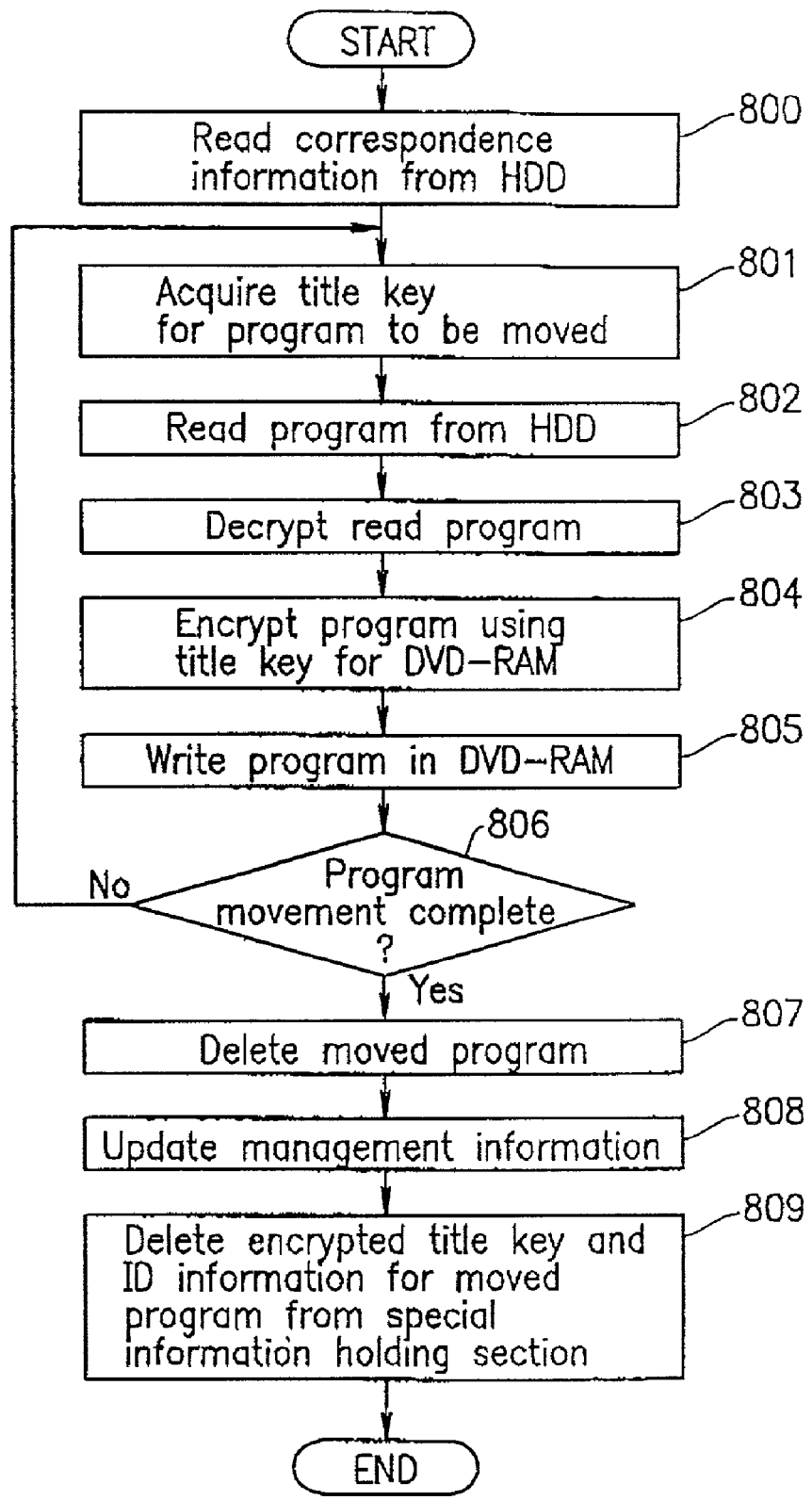
FIG. 17 illustrates a procedure for moving data from a first storage section to a second storage section within a recording/reproducing apparatus of the present invention.

Now, a case where data having data structure information shown in FIG. 16 is moved from the first storage section 111 to the second storage section 113 (see FIG. 7 or 11) is described. Data described in this section is data from which production of a first generation copy is permitted FIG. 17 illustrates a procedure for moving data from the first storage section 111 to the second storage section 113 within the recording/reproducing apparatus of the present invention (see FIG. 7 or 11). In this example, assume that the fixed storage device 107 of the first storage section 111 is a hard disc 702; the information recording medium 109 of the second storage section 113 is a DVD-RAM; the predetermined unit amount of data is the program P1; and the program P1 stored in the hard disc 702 as shown in FIG. 16 is moved to the DVD-RAM 109. The program P1 is encrypted using the title keys Dk1 to Dk3 and stored in the object region 704 in the hard disk 702.

Step 800:

The correspondence information 709 is read from the correspondence information management region 706 within the management region 703.

Step 801:

ID information (e.g., ID1, ID2, ID3) allocated to respective contents of the program P1 to be moved (e.g., EDk1 (P1-1), EDk2(P1-2), EDk3(P1-3)) are acquired.

Step 802:

The content to be moved, EDk1(P1-1), is read from the object region 704 and stored in the temporary storage section 102.

Step 803:

The encrypted title key (EDs(Dk1)), to which the ID information ID1 obtained at step 801 is allocated, is decrypted using the system key Ds held in the special information holding section 110. The encrypted content EDk1(P1-1) is decrypted using the decrypted title key Dk1 (DDk1(EDk1(P1-1))).

Step 804:

The decrypted content P1-1 is encrypted using a title key Dr, which includes information inherent to a DVD-RAM, for the purpose of preventing illegal copying (EDr(P1-1)).

Step 805:

The encrypted content EDr(P1-1) is recorded in the DVD-RAM 109.

Through steps 800-805, the content P1-1 is moved to (recorded in) the DVD-RAM 109 from the hard disc 702.

Step 806:

Steps 801-805 are repeated until all of the contents included in the program P1(i.e., the remaining contents P1-2 and P1-3) are moved into the DVD-RAM 109.

Step 807:

After all of the contents included in the program P1 have been moved into the DVD-RAM 109, the contents P1-1, P1-2 and P1-3 are deleted from the object region 704 of the hard disc 702.

Step 808:

The data management region 705 is updated in response to deletion of the program P1. The ID information (ID1, ID2, ID3) allocated to the deleted program P1 are deleted, whereby the correspondence information management region 706 is updated.

Step 809:

The encrypted title keys with ID information (ID1-EDs (Dk1), ID2-EDs(Dk2), ID3-EDs(Dk3)), which are held in the special information holding section 110 and which are used for decrypting the program P1, are deleted Through steps 807-809, the program P1 is deleted from the hard disc 702, whereby movement of the program P1 from the hard disc 702 to the DVD-RAM 109 is completed.

According to embodiment 4, a mismatch occurs between the special information obtained before movement of data from the first storage section 111 to the second storage section 113 and the special information obtained after movement of data from the first storage section 111 to the second storage section 113. Further, after movement of data from the first storage section 111 to the second storage section 113 is completed, a title key used for decrypting the data is deleted due to such arrangements, even if data is copied (harbored) into another hard disc before the data is moved from the first storage section 111, and the harbored data is returned from the another hard disc to the hard disc 702 after movement of the data has been completed, ID information allocated to that data is not present in the special information holding section 110. As a result, the harbored data becomes invalid data, whereby illegal copying can be prevented.

It should be noted that steps 801-809 may be alternatively performed for each content, rather than each program. In such a case, copying of a smaller amount of data can be prevented.

2. Data Which is Allowed to be Stored for a Predetermined Time Period

Now, a case where data having data structure information shown in FIG. 16 is deleted from the first storage section 111(see FIG. 7 or 11) is described. Data described in this section is data which is allowed to be stored for a predetermined time period.

Figure 18:
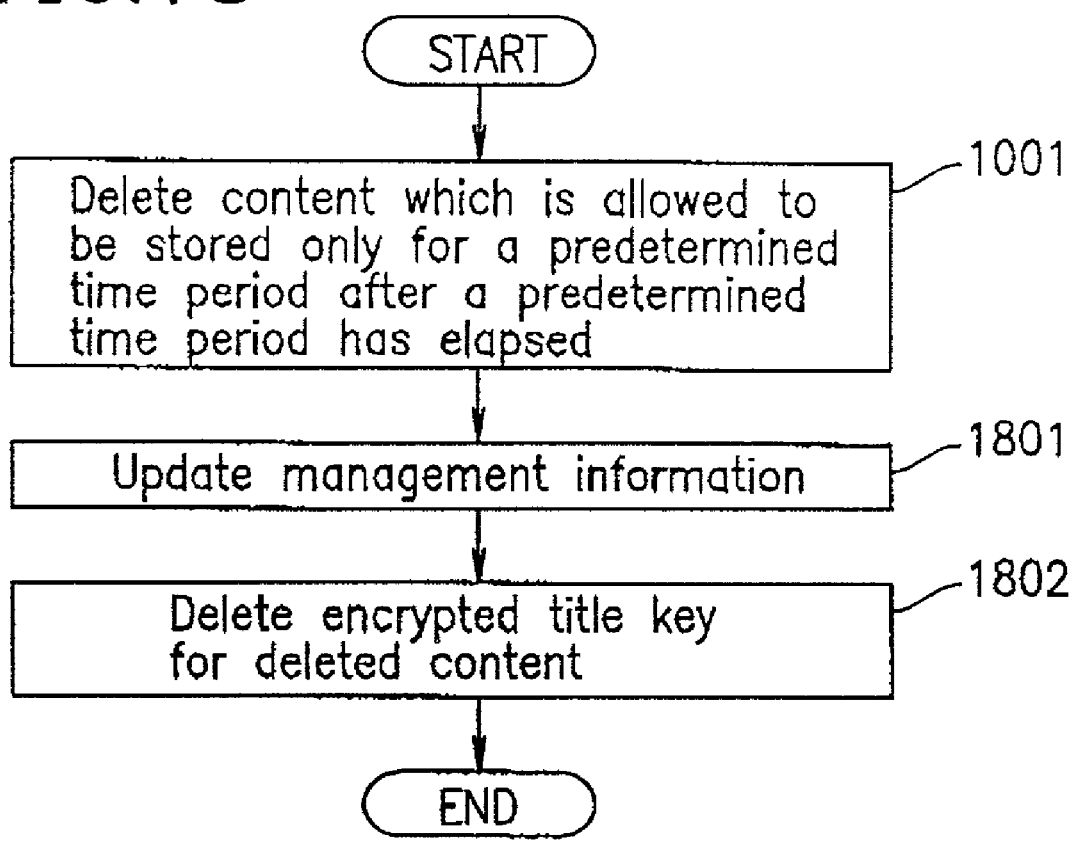
FIG. 18 illustrates a procedure for deleting data from a first storage section of a recording/reproducing apparatus of the present invention.

FIG. 18 illustrates a procedure for deleting data from the first storage section 111 of the recording/reproducing apparatus of the present invention (see FIG. 7 or 11). In this example, assume that the fixed storage device 107 of the first storage section 111 is a hard disc 702 (FIG. 16); the predetermined unit amount of data is the program P1; and the program P1 stored in the hard disc 702 as shown in FIG. 16 is deleted from the hard disc 702 after a predetermined time period has elapsed. The program P1 includes a plurality of contents (P1-1, P1-2, P1-3) which can be stored for a predetermined time period. Step 1001 shown in FIG. 18 is the same as Step 1001 of FIG. 10, and therefore, descriptions of this step is herein omitted.

Step 1801:

The data management region 705 is updated in response to deletion of a content. The ID information allocated to the deleted content are also deleted, whereby the correspondence information management region 706 is updated.

Step 1802:

The encrypted title keys having the ID information, which is the same as that allocated to the deleted content, is deleted.

According to embodiment 4, a mismatch occurs between the special information obtained before deletion of data from the first storage section 111 and the special information obtained after deletion of the data from the first storage section 111. Due to this mismatch, even if data is copied (harbored) into another hard disc before the data is deleted from the first storage section 111, and the harbored data is returned from the another hard disc to the first storage section 111 after a predetermined time period has elapsed and the data is deleted from the first storage section 111, special information which is necessary for decrypting the data is no longer present. Thus, production of a plurality of illegal copies can be prevented, and illegally copied data becomes useless data.

In embodiment 4, the system key 711 held in the special information holding section 110 is updated by the controller 105 at a predetermined time interval. However, according to the present invention, the system key 711 may not be updated. In this case, the same effect as those described above can be achieved without performing re-encryption/ re-decryption of a title key, which is performed in response to an update of the system key. In embodiment 4, when a predetermined unit amount of data (e.g., a single program), or a predetermined amount of content included in the predetermined unit amount of data, is moved/deleted, an encrypted title key which has the same ID information as that allocated to the moved/deleted data (or content) is deleted from the special information holding section 110. With such an arrangement, it is impossible to restore an encrypted title key having the same ID information as that allocated to data that was illegally copied before movement/ deletion of the data.

Embodiment 5

Figure 19:
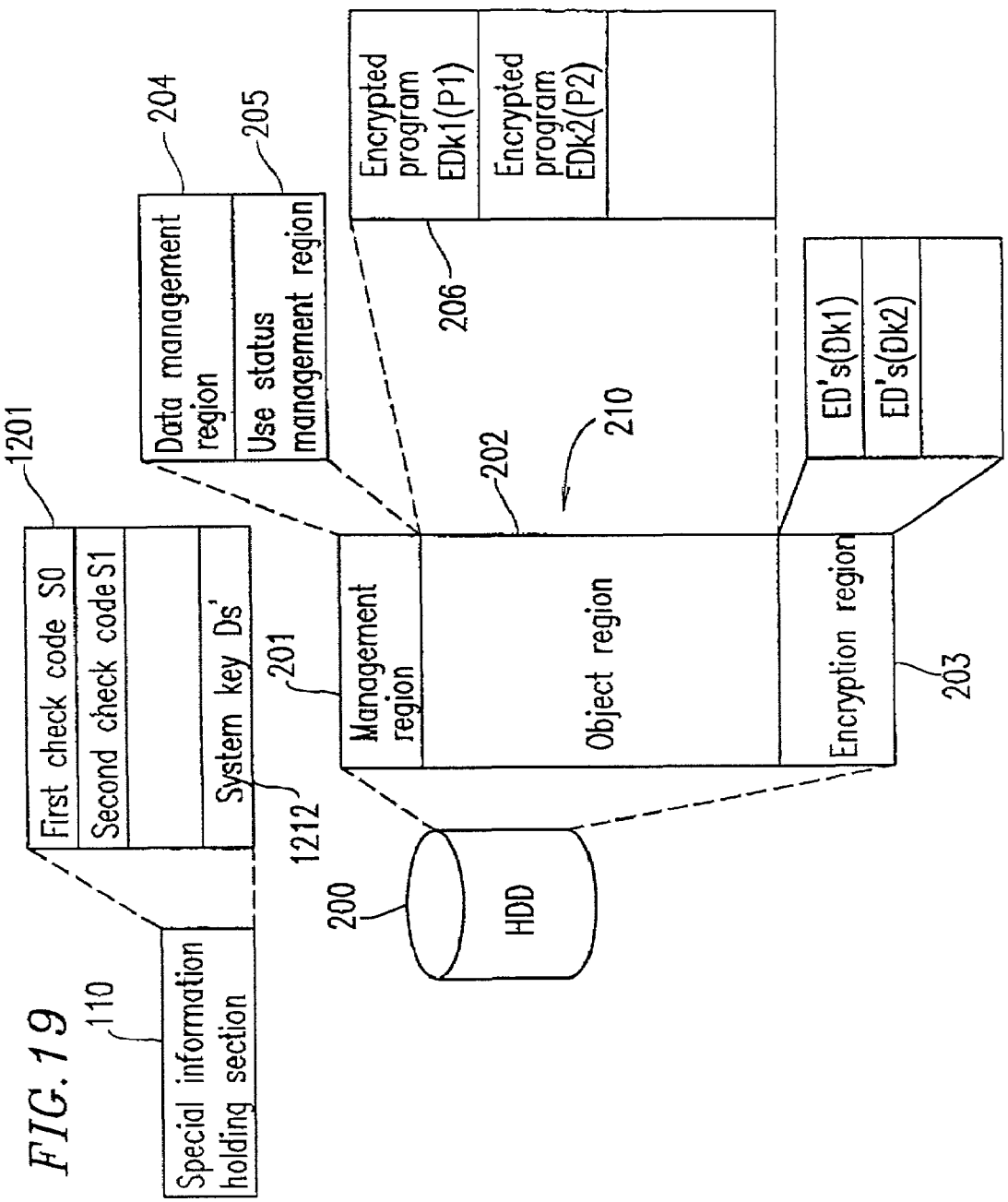
FIG. 19 shows data structure information including data (program) P1 and P2, which is stored in a fixed storage device, and special information held in a special information holding section.

FIG. 19 shows data structure information including data (program) P1 and P2, which is stored in the fixed storage device 107 (see FIG. 7 or 11), and special information held in the special information holding section 110.

The special information holding section 110 shown in FIG. 19 includes a check code region 1201 and a system key 1212. The check code region 1201 includes a first check code S0 and a second check code S1. The first check code S0 is a value obtained by means of calculation based on management information in the management region 201 using a one-way function (e.g., a hash function). Similarly, the second check code S1 is a value obtained by means of calculation based on an encrypted title key in the encryption region 203. The data structure information 210 stored in the hard disk 200 of embodiment 5 has the same structure as that of the data structure information 210 of embodiment 1.

Embodiment 5 is the same as embodiment 1 except that the special information holding section 110 includes the check code region 1201. Every time a predetermined unit amount of data (e.g., program P1) comes to the fixed storage device 107 (e.g., hard disc 200) and is stored therein, the first check code S0 and the second check code S1 held in the check code region 1201 are updated by means of calculations based on the management information and the encrypted title key, respectively. The other details of recording and reproducing operations of the recording/reproducing apparatus according to embodiment 5 are the same as those of embodiment 1, and therefore are not described herein.

In embodiment 5, as described above, a title key used for decrypting an encrypted data stored in the fixed storage device 107 is encrypted by using a system key held in the special information holding section 110, which is provided separately from the fixed storage device 107. With such an arrangement, it is impossible to obtain reproducible data only from the data stored in the fixed storage device 107. Further, the first check code S0 and the second check code S1 held in the special information holding section 110 are calculated from the management information in the management region 201 and the encrypted title key in the encryption region 203, respectively. In normal operation, the first check code S0 held in the special information holding section 110 and the first check code S0 calculated from the management information always have the same value Similarly, the second check code S1 held in the special information holding section 110 and the second check code S1 calculated from the encrypted title key always have the same value. Thus, validity of data can be checked by determining whether or not the first check code S0 held in the special information holding section 110 and the first check code S0 calculated from the management information always have the same value, or whether or not the second check code S1 held in the special information holding section 110 and the second check code S1 calculated from the encrypted title key always have the same value.

1. Data From Which Production of First Generation Copy is Permitted

Now, a case where data having data structure information shown in FIG. 19 is moved from the first storage section 111 to the second storage section 113 (see FIG. 7 or 11) is described. Data described in this section is data from which production of a first generation copy is permitted.

Figure 20:
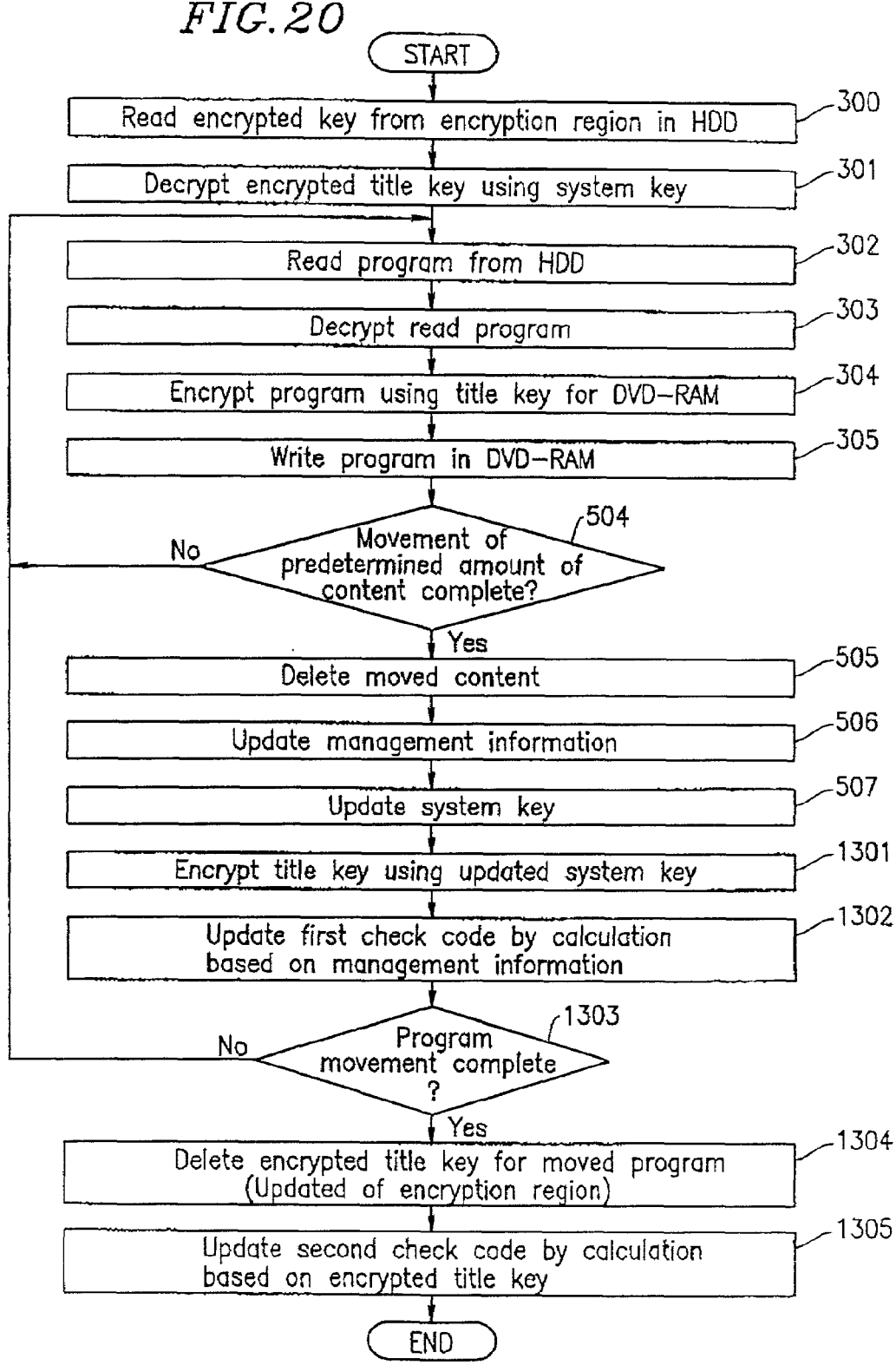
FIG. 20 illustrates a procedure for moving data from a first storage section to a second storage section within a recording/reproducing apparatus of the present invention.

FIG. 20 illustrates a procedure for moving data from the first storage section 111 to the second storage section 113 within the recording/reproducing apparatus of the present invention (see FIG. 7 or 11). In this example, assume that the fixed storage device 107 of the first storage section 111 is a hard disc 200; the information recording medium 109 of the second storage section 113 is a DVD-RAM; the predetermined unit amount of data is the program P1; and the program P1 stored in the hard disc 200 as shown in FIG. 19 is moved from the hard disc 200 to the DVD-RAM 109. The program P1 is encrypted using the title key Dk1 and stored in the object region 202 in the hard disk 200. In embodiment 5, steps for deleting from the hard disk 200 a predetermined amount of content included in the program P1 and updating the system key shown in FIG. 20 (steps 300-305 and 504-507 of FIG. 20) are the same as steps 300-305 and 504-507 shown in FIG. 13. Thus, description of these steps are not here in omitted. Note that the "predetermined amount of content" may be video data having the reproduction length of about three minutes, for example.

Step 1301:

The updated system key is used to encrypt the title key, whereby the encryption region is updated.

Step 1302:

By means of a calculation based on the management information stored in the management region 201, the first check code S0 held in the special information holding section 110 is updated.

Step 1303:

Steps 302 to 305, 504-507, and 1301-1302 are repeated until the data amount of the moved content becomes equal to a predetermined unit amount of data (program P1).

Step 1304:

When the data amount of the moved content becomes equal to the amount of the program P1 (the predetermined unit data amount), the encrypted title key, which was used for decrypting the program P1, is deleted from the encryption region 203, whereby the encryption region 203 as updated.

Step 1305:

By means of a calculation based on the encrypted title key, the second check code S1 held in the special information holding section 110 is updated.

According to embodiment 5, a mismatch occurs between the special information (system key Ds' and first or second check code) obtained before movement of the predetermined amount of content among the predetermined unit amount of data from the first storage section 111 to the second storage section 113 and the special information (system key Ds" and first or second check code) obtained after movement of the predetermined amount of content among the predetermined unit amount of data from the first storage section 111 to the second storage section 113. Further, the first check code S0 or the second check code S1 is updated by means of a calculation based on the management information stored in the management region 201, or a calculation based on the encrypted title key every time the predetermine amount of content is moved from the first storage section 111 to the second storage section 113. In embodiment 5, in the case where a fraudulent party interrupts data movement by disconnecting the power supply to the recording/reproducing apparatus in order to restore the data which has been deleted from the first storage section 111, the first check code SO or the second check code S1 held in the special information holding section 110 does not match with the value of the first check code S0 or the second check code S1 which is calculated from the data structure information 210. Due to such check codes, an illegal activity committed by a fraudulent party can be readily detected.

2. Data Which is Allowed to be Stored for a Predetermined Time Period

Now, a case where data having data structure information shown in FIG. 19 is deleted from the first storage section 111 (see FIG. 7 or 11) is described. Data described in this section is data which is allowed to be stored for a predetermined time period.

Figure 21:
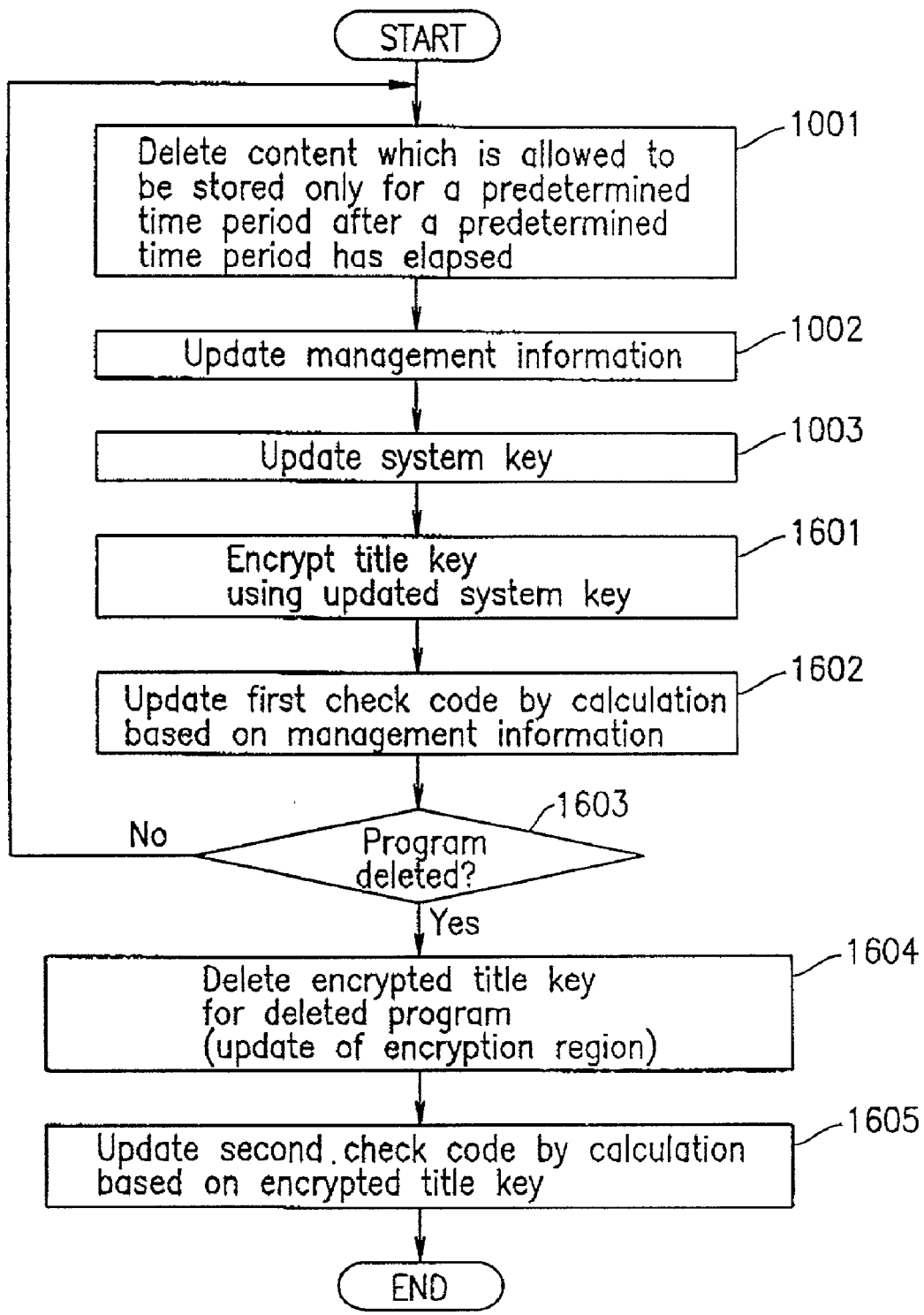
FIG. 21 illustrates a procedure for deleting data from a first storage section of a recording/reproducing apparatus of the present invention.

FIG. 21 illustrates a procedure for deleting data from the first storage section 111 of the recording/reproducing apparatus of the present invention (see FIG. 7 or 11). In this example, assume that the fixed storage device 107 of the first storage section 111 is a hard disc 200 (FIG. 19); the predetermined unit amount of data is the program P1; and the program P1 stored in the hard disc 200 as shown in FIG. 19 is deleted from the hard disc 200 after a predetermined time period has elapsed. The program P1 includes a plurality of contents which can be stored for a predetermined time period. Steps 1001-1003 shown in FIG. 21 are the same as steps 1001-1003 of FIG. 10, and therefore, descriptions of these steps are herein omitted.

Step 1601:

The system key Ds" updated at step 1003 is used to encrypt the title keys Dk1 and Dk2, whereby the encryption region 203 is updated.

Step 1602:

By means of a calculation based on the management information stored in the management region 201, the first check code S0 held in the special information holding section 110 is updated.

Step 1603:

Steps 1001-1003 and 1601 and 1602 are repeated until the amount of the deleted contents becomes equal to the predetermined unit data amount, i.e., the data amount of the program P1.

Step 1604:

When the amount of the deleted contents becomes equal to the predetermined unit data amount, i.e., the data amount of the program P1, the encrypted title key EDs" (Dk1) which is used for decrypting the program P1 is deleted from the encryption region 203, whereby the encryption region 203 is updated.

Step 1605:

By means of a calculation based on the encrypted title key, the second check code S1 held in the special information holding section 110 is updated.

According to embodiment 5, a mismatch occurs between the special information (system key Ds' and first or second check code) obtained before deletion of the predetermined amount of content among the predetermined unit amount of data from the first storage section 111 and the special information (system key Ds" and first or second check code) obtained after deletion of the predetermined amount of content among the predetermined unit amount of data from the first storage section 111. Due to this mismatch, even if data is copied (harbored) into another hard disc before the data is deleted from the first storage section 111, and the harbored data is returned from the another hard disc to the first storage section 111 after a predetermined time period has elapsed and the data is deleted from the first storage section 111, special information which is necessary for decrypting the data is no longer present. Thus, production of a plurality of illegal copies can be prevented, and illegally copied data becomes useless data.

Furthermore, in such a case the first check code S0 or the second check code S1 held in the special information holding section 110 does not match with the value of the first check code S0 or the second check code S1 which is calculated from the data structure information 210. Thus, an illegal activity committed by a fraudulent party can be readily detected.

In embodiment 5, the system key 1212 held in the special information holding section 110 is updated by the controller 105 every time a predetermined amount of content are deleted. However, according to the present invention, the system key 711 may not be updated. That is, steps 507 and 1301 of FIG. 20 and steps 1003 and 1601 of FIG. 21 can be omitted. In this case, the same effect as those described above can be achieved without performing re-encryption/re-decryption of a title key, which is performed in response to an update of the system key.

According to embodiment 5, a mismatch occurs between the special information (first or second check code) obtained before movement/deletion of the predetermined amount of content among the predetermined unit amount of data from the first storage section 111 and the special information (first or second check code) obtained after movement/deletion of the predetermined amount of content among the predetermined unit amount of data from the first storage section 111. Further, if illegal copying is conducted by a fraudulent party, the first check code S0 or the second check code S1 held in the special information holding section 110 is not identical to the value of the first check code S0 or the second check code S1 which is calculated from the data structure information 210. Thus, an illegal activity committed by a fraudulent party can be readily detected by simply determining whether the first or second check codes obtained before and after the data movement or deletion operation are identical or not.

Embodiment 6

FIG. 22 shows a procedure for imposing a penalty on a fraudulent party. Embodiment 6 is realized in the recording/reproducing apparatus (for example, the recording/reproducing apparatus 114 (FIG. 7) or the recording/reproducing apparatus 1520 (FIG. 11)) which records/reproduces data having the data structure information according to embodiment 5 (shown in FIG. 19). In embodiment 6, the fixed storage device 107 of the first storage section 111 is the hard disc 200 of FIG. 19. The hard disc 200 includes the data structure information as shown in FIG. 19.

Hereinafter, steps of the procedure for imposing a penalty on a fraudulent party are described with reference to FIG. 22.

Step 1701:

The value of the first check code S0 is calculated from the management information of the management region 201 immediately after the start-up of the recording/reproducing apparatus.

Step 1702:

The first check code S0 held in the special information holding section 110 is read out.

Step 1703:

It is determined whether or not the value of the first check code S0 calculated at step 1701 is identical to the value of the first check code S0 read out at step 1702. If identical, the process proceeds to step 1704. If not identical, the process proceeds to step 1707.

Step 1704:

It "identical" at step 1703, the value of the second check code S1 is calculated from the encrypted title key of the encryption region 203.

Step 1705:

The second check code S1 held in the special information holding section 110 is read out.

Step 1706:

It is determined whether or not the value of the second check code S1 calculated at step 1704 is identical to the value of the second check code S1 read out at step 1705. If identical, it is determined that no illegal processing is performed, and the recording/reproducing apparatus can perform a normal operation. If not identical, the process proceeds to step 1707.

Step 1707:

If "not identical" at step 1703 or step 1706, it is determined that an illegal processing has been performed, and an access by the controller 105 to the hard disc 200 is restricted.

According to embodiment 6, it is determined whether or not the value of the first check code S0 held in the special information holding section 110 at the start-up of the recording/reproducing apparatus is identical to the value of the first check code S0 calculated based on the management information and/or whether or not the value of the second check code S1 held in the special information holding section 110 is identical to the value of the second check code S1 calculated based on the encrypted title key. If not identical, it is determined that a fraudulent party conducted an illegal activity, and an access by the controller 105 to the hard disc 200 is restricted. On the other hand, a penalty can be imposed on the fraudulent party. For example, the fraudulent party is compelled to re-format data; an access by the fraudulent party is ignored by the recording/reproducing apparatus; or the fraudulent party is compelled to initialize the encryption region. According the present invention, such a penalty may be realized by any means which can bring some disbenefits to a fraudulent party in retaliation for his illegal data processing.

A recording/reproducing apparatus of the present invention includes: a first storage section for storing data structure information which includes encrypted data; a special information holding section for holding special information associated with the data structure information; and a controller for controlling the first storage section and the special information holding section. The data structure information and the special information are associated with each other such that the special information is updated in response to an update of the data structure information, or such that the data structure information is updated in response to an update of the special information. With such an arrangement, the data structure information and the special information are stored separately, while the data structure information and the special information can be controlled so as to be associated with each other. As a result, the encrypted data of the data structure information cannot be solely encrypted. Therefore, the data structure information can be more securely stored.

Furthermore, in the recording/reproducing apparatus of the present invention, the control section controls movement of the encrypted data from the first storage section to a second storage section; and the control section updates the special information held in the special information holding section such that a mismatch occurs between the special information obtained before the movement of the encrypted data from the first storage section to the second storage section and the special information obtained after the movement of the encrypted data from the first storage section to the second storage section. With such an arrangement, the special information which is necessary for decrypting the encrypted data can be different between before and after the movement of the encrypted data from the first storage section to the second storage section. As a result, illegally copied data becomes useless by itself, and production of a plurality of illegal copies becomes impossible.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording/reproducing apparatus, comprising:

a first storage section for storing data structure information which includes encrypted data;

a special information holding section for holding special information associated with the data structure information; and a controller for controlling the first storage section and the special information holding section, wherein the data structure information and the special information are associated with each other such that the special information is updated in response to an update of the data structure information, or such that the data structure information is updated in response to an update of the special information, the controller controls movement of the encrypted data from the first storage section to a second storage section, and the controller updates the special information held in the special information holding section such that a mismatch occurs between the special information obtained before the movement of the encrypted data from the first storage section to the second storage section and the special information obtained after the movement of the encrypted data from the first storage section to the second storage section, wherein the data structure information includes:

an object region for storing data which is encrypted using a title key corresponding to a predetermined unit amount of data;

a management region for storing management information of the encrypted data; and an encryption region for storing the title key and the management information which are encrypted using a system key, wherein the special information is the system key, the controller controls a movement of a predetermined amount of content included in the encrypted data from the first storage section to the second storage section, the controller updates the system key every time the predetermined amount of content is moved from the first storage section to the second storage section, every time the predetermined amount of content is moved from the first storage section to the second storage section, the controller deletes the moved predetermined amount of content from the object region, updates the management information, and encrypts the title key and the updated management information using the updated system key, and when the amount of moved contents becomes equal to the predetermined unit data amount, the controller deletes from the encryption region the encrypted title key which is used for decrypting the data.

2. A recording/reproducing apparatus according to claim 1, wherein, at the start-up of the recording/reproducing apparatus, the controller decrypts the management information using the system key, and overwrites the decrypted management information in the management region.

3. A recording/reproducing apparatus, comprising:

a first storage section for storing data structure information which includes encrypted data;

a special information holding section for holding special information associated with the data structure information; and a controller for controlling the first storage section and the special information holding section, wherein the data structure information and the special information are associated with each other such that the special information is updated in response to an update of the data structure information, or such that the data structure information is updated in response to an update of the special information, the controller controls movement of the encrypted data from the first storage section to a second storage section, and the controller updates the special information held in the special information holding section such that a mismatch occurs between the special information obtained before the movement of the encrypted data from the first storage section to the second storage section and the special information obtained after the movement of the encrypted data from the first storage section to the second storage section, wherein the data structure information includes:
an object region for storing data which is encrypted using a title key corresponding to a predetermined unit amount of data;
a management region for storing management information of the encrypted data; and
an encryption region for storing the title key which is encrypted using a system key,
the special information includes:
a first check code which is calculated from the management information; and
a second check code which is calculated from the encrypted title key,
the controller controls a movement of a predetermined amount of content included in the encrypted data from the first storage section to the second storage section,
every time the predetermined amount of content is moved from the first storage section to the second storage section, the controller deletes from the object region the moved predetermined amount of content, thereby updating the management information,
every time the predetermined amount of content is deleted from the first storage section, the controller updates the first check code held in the special information holding section by means of a calculation based on the updated management information,
when the amount of moved contents becomes equal to the predetermined unit data amount, the controller deletes from the encryption region the encrypted title key which is used for decrypting the data, and
every time the data is deleted, the controller updates the second check code held in the special information holding section by means of a calculation based on the encrypted title key.

4. A recording/reproducing apparatus according to claim 3, wherein:
the special information further includes the system key,
the controller updates the system key every time the predetermined amount of content is moved from the first storage section to the second storage section, and
the controller encrypts the title key using the updated system key, thereby updating the encryption region.

5. A recording/reproducing apparatus according to claim 3, wherein the controller determines whether or not a first check code and a second check code, which are calculated at the start-up of the recording/reproducing apparatus from the management information and the encrypted title key, respectively, are identical to the first check code and the second check code held in the special information holding section.

6. A recording/reproducing apparatus, comprising:
a storage section for storing data structure information which includes encrypted data, the encrypted data including a content which is allowed to be stored for a predetermined time period;
a special information holding section for holding special information associated with the data structure information; and
a controller for controlling the storage section and the special information holding section,
wherein the data structure information and the special information are associated with each other such that the special information is undated in response to an update of the data structure information, or such that the data structure information is updated in response to an update of the special information, the controller controls deletion of the content from the storage section after a predetermined time period has elapsed, and
the controller updates the special information held in the special information holding section such that a mismatch occurs between the special information obtained before the deletion of the content from the storage section and the special information obtained after the deletion of the content from the storage section,
wherein the data structure information includes:
an object region for storing data which is encrypted using a title key corresponding to a predetermined unit amount of data;
a management region for storing management information of the encrypted data; and
an encryption region for storing the title key and management information which are encrypted using a system key,
wherein the special information is the system key,
every time the content is deleted from the storage section after a predetermined time period has elapsed, the controller updates the management information and the system key,
the controller encrypts the title key and the updated management information using the updated system key, and
when the amount of deleted contents becomes equal to the predetermined unit data amount, the controller deletes from the encryption region the encrypted title key which is used for decrypting the data.

7. A recording/reproducing apparatus, comprising:
a storage section for storing data structure information which includes encrypted data, the encrypted data including a content which is allowed to be stored for a predetermined time period;
a special information holding section for holding special information associated with the data structure information; and
a controller for controlling the storage section and the special information holding section,
wherein the data structure information and the special information are associated with each other such that the special information is undated in response to an update of the data structure information, or such that the data structure information is updated in response to an update of the special information,
the controller controls deletion of the content from the storage section after a predetermined time period has elapsed, and
the controller updates the special information held in the special information holding section such that a mismatch occurs between the special information obtained before the deletion of the content from the storage section and the special information obtained after the deletion of the content from the storage section,
wherein the data structure information includes:
an object region for storing data which is encrypted using a title key corresponding to a predetermined unit amount of data;
a management region for storing management information of the encrypted data; and
an encryption region for storing the title key which is encrypted using a system key,
the special information includes:
a first check code which is calculated from the management information; and a second check code which is calculated from the encrypted title key, every time the predetermined amount of content is deleted from the storage section after a predetermined time period has elapsed, the controller updates the management information, every time the management information is updated, the controller updates the first check code held in the special information holding section by means of a calculation based on the updated management information, when the amount of deleted content becomes equal to the predetermined unit data amount, the controller deletes from the encryption region the encrypted title key which is used for decrypting the data, thereby updating the encryption region, and the controller updates the second check code held in the special information holding section by means of a calculation based on the encrypted title key.

8. A method for moving data from a recording/reproducing apparatus, the recording/reproducing apparatus including:

a first storage section for storing data structure information which includes encrypted data;

a special information holding section for holding special information associated with the data structure information; and a controller for controlling the first storage section and the special information holding section, wherein the data structure information and the special information are associated with each other such that the special information is updated in response to an update of the data structure information, or such that the data structure information is updated in response to an update of the special information, the method comprising steps of:

a) moving the encrypted data from the first storage section to a second storage section; and b) updating the special information held in the special information holding section every time step a) is completed such that a mismatch occurs between the special information obtained before step a) and the updated special information, wherein the data structure information includes:

an object region for storing data which is encrypted using a title key corresponding to a predetermined unit amount of data;

a management region for storing management information of the encrypted data; and an encryption region for storing the title key and the management information which are encrypted using a system key, the special information is the system key, step a) includes a step of moving a predetermined amount of content included in the encrypted data from the first storage section to the second storage section, and step b) includes steps of:

b1) deleting the moved predetermined amount of content from the object region;

b2) updating the management information;

b3) updating the system key; and b4) encrypting the title key and the updated management information using the updated system key, the method further includes steps of:

c) repeating steps a) and b) until the amount of the moved content becomes equal to the predetermined unit data amount; and d) when the amount of moved content becomes equal to the predetermined unit data amount, deleting from the encryption region the encrypted title key which is used for decrypting the data.

9. A method according to claim 8, further comprising steps of:

e) acquiring the system key from the special information holding section;

f) decrypting the management information stored in the encryption region using the system key; and g) overwriting the decrypted management information in the management region.

10. A method for moving data from a recording/reproducing apparatus, the recording/reproducing apparatus including:

a first storage section for storing data structure information which includes encrypted data;

a special information holding section for holding special information associated with the data structure information; and a controller for controlling the first storage section and the special information holding section, wherein the data structure information and the special information are associated with each other such that the special information is updated in response to an update of the data structure information, or such that the data structure information is updated in response to an update of the special information, the method comprising steps of:

a) moving the encrypted data from the first storage section to a second storage section; and b) updating the special information held in the special information holding section every time step a) is completed such that a mismatch occurs between the special information obtained before step a) and the updated special information, wherein the data structure information includes:

an object region for storing data which is encrypted using a title key corresponding to a predetermined unit amount of data;

a management region for storing management information of the encrypted data; and an encryption region for storing the title key which is encrypted using a system key, the special information includes:

a first check code which is calculated from the management information; and a second check code which is calculated from the encrypted title key, step a) includes a step of moving a predetermined amount of content included in the encrypted data from the first storage section to the second storage section, step b) includes steps of:

b1) deleting the moved predetermined amount of content from the object region b2) updating the management information; and b3) updating the first check code by means of a calculation based on the updated management information, and the method further includes steps of:

c) repeating steps a) and b) until the amount of the moved content becomes equal to the predetermined unit data amount;

d) when the amount of moved content becomes equal to the predetermined unit data amount, deleting from the encryption region the encrypted title key which is used for decrypting the data; and e) updating the second check code by means of a calculation based on the encrypted title key.

11. A method according to claim 10, wherein:

the special information further includes the system key; and step b) further includes a step of updating the system key and encrypting the title key using the updated system key.

12. A method according to claim 10, further comprising steps of:

f) calculating the first check code from the management information;

g) determining whether or not the first check code obtained at step f) is identical to the first check code held in the special information holding section;

h) if the determination result of step g) indicates "not identical", restricting the controller in controlling the first storage section, but if the determination result of step g) indicates "identical", calculating the second check code from the encrypted title key;

i) determining whether or not the second check code obtained at step h) is identical to the second check code held in the special information holding section; and j) if the determination result of step i) indicates "not identical", restricting the controller in controlling the first storage section, but if the determination result of step i) indicates "identical", allowing the controller to control the first storage section.

13. A method for deleting data from a recording/reproducing apparatus, the recording/reproducing apparatus including:

a storage section for storing data structure information which includes encrypted data, the encrypted data including a content which is allowed to be stored for a predetermined time period;

a special information holding section for holding special information associated with the data structure information; and a controller for controlling the storage section and the special information holding section, wherein the data structure information and the special information are associated with each other such that the special information is undated in response to an update of the data structure information, or such that the data structure information is updated in response to an update of the special information, the method comprising steps of:

a) after a predetermined time period has elapsed, deleting the content from the storage section; and b) updating the special information held in the special information holding section every time step a) is completed such that a mismatch occurs between the special information obtained before step a) and the undated special information, wherein the data structure information includes:

an object region for storing data which is encrypted using a title key corresponding to a predetermined unit amount of data;

a management region for storing management information of the encrypted data; and an encryption region for storing the title key and the management information which are encrypted using a system key, the special information is the system key, step b) includes steps of:

b1) updating the management information;

b2) updating the system key; and b3) encrypting the title key and the updated management information using the updated system key, the method further includes, c) repeating steps a) and b) until the amount of the deleted content becomes equal to the predetermined unit data amount; and d) when the amount of deleted content becomes equal to the predetermined unit data amount, deleting from the encryption region the encrypted title key which is used for decrypting the data.

14. A method according to claim 9, wherein the data structure information includes:

an object region for storing a content which is a part of the encrypted data and which is encrypted using a title key corresponding to the content; and a management region for storing management information of the encrypted content and correspondence information which represents a correspondence between the encrypted content and the title key used for decrypting the encrypted content, the correspondence being established by allocating ID information to the encrypted content, the special information includes the title key to which the ID information is allocated and which is encrypted using a system key, step b) includes steps of:

b1) updating the management information; and b2) deleting the encrypted title key which has the same ID information as that allocated to the deleted content.

15. A method according to claim 14, wherein:

the special information further includes the system key; and step b) further includes a step of updating the system key at every predetermined time and encrypting the title key using the updated system key.

16. A method for deleting data from a recording/reproducing apparatus, the recording/reproducing apparatus including:

a storage section for storing data structure information which includes encrypted data, the encrypted data including a content which is allowed to be stored for a predetermined time period;

a special information holding section for holding special information associated with the data structure information; and a controller for controlling the storage section and the special information holding section, wherein the data structure information and the special information are associated with each other such that the special information is updated in response to an update of the data structure information, or such that the data structure information is updated in response to an update of the special information, the method comprising steps of:

a) after a predetermined time period has elapsed, deleting the content from the storage section; and b) updating the special information held in the special information holding section every time step a) is completed such that a mismatch occurs between the special information obtained before step a) and the updated special information, wherein the data structure information includes:
an object region for storing data which is encrypted using a title key corresponding to a predetermined unit amount of data;
a management region for storing management information of the encrypted data; and
an encryption region for storing the title key which is encrypted using a system key, the special information includes:
a first check code which is calculated from the management information; and
a second check code which is calculated from the encrypted title key, step b) includes steps of:
b1) updating the management information; and
b2) updating the first check code by means of a calculation based on the updated management information, and the method further includes steps of:
c) repeating steps a) and b) until the amount of the deleted content becomes equal to the predetermined unit data amount;
d) when the amount of deleted content becomes equal to the predetermined unit data amount, deleting from the encryption region the encrypted title key which is used for decrypting the data; and
e) updating the second check code by means of a calculation based on the encrypted title key.

17. A method according to claim 16, wherein:
the special information further includes the system key; and
step b) further includes a step of updating the system key and encrypting the title key using the updated system key.

* * * * *

UNITED STATES PATENT AND TRADEMARK OFFICE
CERTIFICATE OF CORRECTION

PATENT NO. : 7,298,844 B2 Page 1 of 1
APPLICATION NO. : 10/115405
DATED : November 20, 2007
INVENTOR(S) : Hiroshi Sugimoto et al.

It is certified that error appears in the above-identified patent and that said Letters Patent is hereby corrected as shown below:

On the Title Page Item (73), "Kasoma" should read -- Kadoma --.

Column 37, line 47, "undated" should read -- updated --.

Signed and Sealed this

Third Day of June, 2008

JON W. DUDAS
*Director of the United States Patent and Trademark Office*